United States Patent [19]

Sekine et al.

[11] Patent Number: 5,107,293
[45] Date of Patent: Apr. 21, 1992

[54] AUTOMATIC IMAGE STABILIZATION DEVICE

[75] Inventors: Masayoshi Sekine, Tokyo; Masamichi Toyama; Kazuhiro Noguchi, both of Kanagawa; Toshiyuki Nakajima, Tokyo; Koji Takahashi, Kanagawa, all of Japan

[73] Assignee: Canon Kabushiki Kaisha, Tokyo, Japan

[21] Appl. No.: 403,455

[22] Filed: Sep. 6, 1989

[30] Foreign Application Priority Data

Sep. 9, 1988 [JP] Japan .................... 63-226016
Sep. 9, 1988 [JP] Japan .................... 63-226017

[51] Int. Cl.⁵ .................................. G03B 7/08
[52] U.S. Cl. .................. 354/430; 354/70; 358/222; 359/554
[58] Field of Search ............ 354/430, 70, 65; 358/222, 227, 213.11; 350/500

[56] References Cited

U.S. PATENT DOCUMENTS 4,623,930 11/1986 Oshima et al. .............. 354/430
4,678,323 7/1987 Sato et al. ................. 354/403
4,780,739 10/1988 Kawakami et al. ........... 354/430
4,788,596 11/1988 Kawakami et al. ........... 358/222
4,872,058 10/1989 Baba et al. ................. 358/227

Primary Examiner—L. T. Hix
Assistant Examiner—David M. Gray
Attorney, Agent, or Firm—Robin, Blecker, Daley & Driscoll

[57] ABSTRACT

An automatic image stabilization device which is arranged to detect image movement information from a sensed image signal produced from an image sensor and to reduce the image movement comprises a movement detecting circuit which obtains movement vector information for each of a plurality of parts of an image plane, and a weight setting circuit arranged to attach weight to each movement vector information and to vary the weighting degree according to photographing conditions. A camera using this device is arranged to correct the shaking of the camera on the basis of the result of a computing operation performed on a camera shake detected from the signal produced from the image sensor together with a camera shake physically detected by means of an accelerometer.

50 Claims, 14 Drawing Sheets

BLOCKS
IMAGE PLANE
MOVEMENT VECTOR

BLOCKS

MOVEMENT VECTOR (I) IMAGE PLANE PATTERN (1): $N < N1$

FIG.10(a)

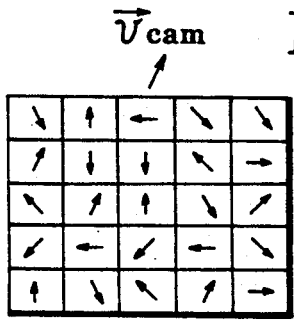
$\vec{V}_{cam}$

FIG.10(b) $\vec{V}_{cam}$

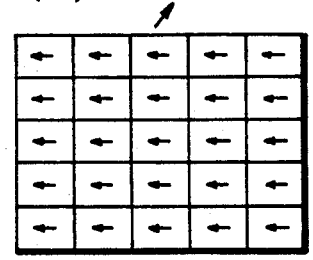

REPRESENTATIVE MOVEMENT VECTOR $\vec{V}_{cam}$
PAN-TILT CONTROL SIGNAL
PTCON=1

(II) IMAGE PLANE PATTERN (2): $N > N2$

FIG.10(c)

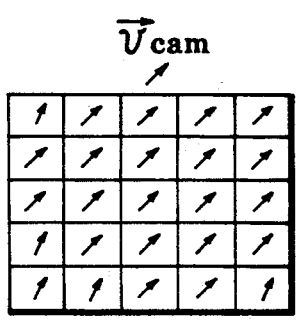
$\vec{V}_{cam}$

REPRESENTATIVE MOVEMENT VECTOR $\vec{V}_{cor1}$
PAN-TILT CONTROL SIGNAL
PTCON=1

(III) IMAGE PLANE PATTERN (3): $M < M1$

FIG.10(d)

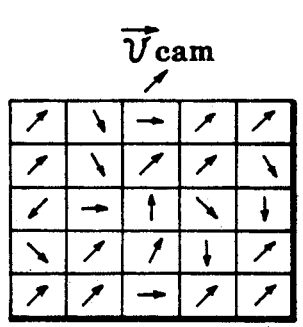
$\vec{V}_{cam}$

REPRESENTATIVE MOVEMENT VECTOR $\vec{V}_{cor1}$
PAN-TILT CONTROL SIGNAL
PTCON=1

(IV) IMAGE PLANE PATTERN (4): $M \geqq M1$

FIG.10(e)

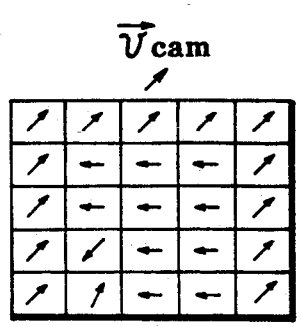
$\vec{V}_{cam}$

REPRESENTATIVE MOVEMENT VECTOR $\vec{V}_{cor2}$
PAN-TILT CONTROL SIGNAL
PTCON=0

| IMAGE PLANE PATTERN | PAN-TILT CONTROL SIGNAL PTCONT | PAN-TILT MODE SIGNAL PTMODE | AND OUTPUT OF MULTIPLIER 404 |
|---|---|---|---|
| ① | 1 | 1 | 1 |
|   |   | 0 | 0 |
| ② | 1 | 1 | 1 |
|   |   | 0 | 0 |
| ③ | 1 | 1 | 1 |
|   |   | 0 | 0 |
| ④ | 0 | 1 | 0 |
|   |   | 0 | 0 |

FIG.12

AUTOMATIC IMAGE STABILIZATION DEVICE

BACKGROUND OF THE INVENTION

1. Field of the Invention

This invention relates to a device arranged to detect the relative movements of a camera and an object to be photographed and to lessen the shaking of an image of the object resulting from the movements.

2. Description of the Related Art

Faulty photographing due to the shaking of a camera has presented a serious problem. In the case of a video camera adapted for taking a motion picture in particular, camera shaking greatly degrades a picture on a monitor or a reproduced picture. To solve this problem, therefore, image stabilization devices of varied kinds have been contrived. One of them is arranged, for example, to stabilize image shakes due to the vibrations of a lens holding hand by utilizing the stability of a rotating gyro. Another known stabilization device is arranged to detect a camera shake with an accelerometer provided on the camera and to move the lens in the direction of offsetting the shake by means of an actuator such as a motor or the like.

Although these known methods may give a good shake correcting effect, they necessitates the use of such a mechanism as the rotating gyro, the accelerometer or the like. Therefore, they are not acceptable for a video camera requiring reduction in size, weight and cost. It is another shortcoming of them that the mere use of such an external sensor having the rotating gyro, accelerometer or the like hardly gives adequate characteristics in terms of responsivity, accuracy, sensitivity, etc..

To eliminate the shortcomings of the above-stated methods, another method has been proposed. In accordance with this method, the relative movements of the camera and an object to be photographed are detected from a sensed image signal obtained by the video camera; and the position of the whole or a part of a lens assembly is shifted in the direction of offsetting an image shake resulting from the relative movements. This method obviates the necessity of the rotating gyro or the accelerometer and is advantageous for reduction in size, weight and cost as the image shake is detected purely in an electronic manner. This method has been disclosed in U.S. Pat. No. 4,788,596 and U.S. patent application Ser. No. 880,152 filed on Jun. 30, 1986.

In accordance with the above-stated method of using the sensed image signal, however, the shaking of the camera is hardly distinguishable from the movement of the object. In cases where the object is moving, the object's movement might be corrected by mistake. Therefore, faulty actions have often been performed to give unnatural pictures.

Other methods for detecting the movement of an object within an image plane, including those not aimed at stabilization of image shakes, have been disclosed in: U.S. Pat. No. 4,678,323 and U.S. patent applications Ser. No. 106,427 filed on Oct. 8, 1987; Ser. No. 154,078 filed on Feb. 9, 1988; Ser. No. 237,511 filed on Aug. 26, 1988; Ser. No. 240,915 filed on Sep. 6, 1988; Ser. No. 264,204 filed on Oct. 28, 1988; and Ser. No. 319,658 filed on Mar. 6, 1989.

SUMMARY OF THE INVENTION

This invention is directed to the solution of the above-stated problems. It is, therefore, a first object of the invention to provide an image sensing apparatus which is capable of reliably distinguishing the movement of an object to be photographed from the movement (shakes) of a camera using the device.

A second object of the invention is to provide an image shake detecting device which is capable of accurately detecting and correcting camera shaking with good responsivity without recourse to any external sensor.

A third object of the invention is to provide an image sensing apparatus wherein the movement of an object to be photographed or the shaking of the apparatus is detected from the movement of an image of the object obtained within an image plane; and an image shake detecting action and an automatic focusing action can be accomplished according to the result of detection.

Under this object, an automatic image stabilization device which is arranged as a preferred embodiment of the invention to detect information on an image movement from an image signal produced from image sensing means and to lessen the image movement on the basis of the movement information comprises: movement detecting means for obtaining vector information on image movements taking place at a plurality of points of an image plane; and weight setting means which is arranged to attach weight to the vector information obtained from each of the points and to vary the weight according to photographing conditions.

This arrangement enables the embodiment to discriminate an image shake due to the movement of the object from an image shake due to that of the camera and to accurately correct the image shake. The embodiment is thus arranged to be capable of making optimum image shake correction under various photographing conditions.

It is a fourth object of the invention to provide a highly efficient automatic image stabilization device which eliminates the shortcomings of the conventional image stabilization device of the purely electronic image shake detecting type mentioned in the foregoing.

It is a fifth object of the invention to provide a device which is capable of performing an image stabilizing action by clearly discriminating the movement of an object to be photographed from the movement of a camera using the device, so that an image plane can be obtained in a natural state with discrimination always correctly made between a moving object and a stationary object.

It is a sixth object of the invention to provide an image sensing apparatus which are capable of solving both the problem presented by the conventional apparatus arranged to detect image shakes solely with an external sensor and the problem presented by the conventional apparatus arranged to detect image shakes solely with electronic detecting means by using an image signal.

It is a seventh object of the invention to provide an image sensing apparatus which is arranged for a camera to detect the shaking of images from a plurality of detected objects and to be capable of making an accurate discrimination between the movement of an object to be photographed and that of the camera irrespectively of photographing conditions.

Under that object, an image sensing apparatus arranged according to the invention as a preferred embodiment thereof comprises: first and second movement detection means which are arranged to detect the shaking degree of the apparatus on the basis of information of different kinds; third movement detection means arranged to produce third movement information by computing values of first and second movement information produced by said first and second movement detection means; and correction means for controlling the position of an optical system in such a way as to correct the shaking of the apparatus on the basis of the third movement information produced by said third movement detection means.

It is an eighth object of the invention to provide an image sensing apparatus which is arranged for a camera to detect information on the movement of the camera on the basis of a plurality of movement information values obtained from different detected objects by means of, for example, an external sensor which detects acceleration, velocity, displacement or the like; and to correct an image shake correction signal by comparing and computing the result of detection with an image movement vector obtained by an image processing action on a video signal, so that fluctuations in the detection accuracy due to difference in the pattern of images and a faulty action can be prevented to ensure a correcting function excelling in such characteristics as responsivity and sensitivity, etc..

Other objects and features of the invention will become apparent from the following detailed description of embodiments thereof taken in connection with the accompanying drawings.

BRIEF DESCRIPTION OF THE DRAWINGS

FIGS. 10(a) to 10(e) show the patterns of vector distribution which are obtained on the image sensing plane and to be discriminated from each other by the representative movement vector computing circuit.

FIG. 12 shows the logic operation of the same correction signal generating circuit performed for the image patterns shown in FIGS. 10(a) to 10(e).

DETAILED DESCRIPTION OF THE PREFERRED EMBODIMENTS

Figure 1:
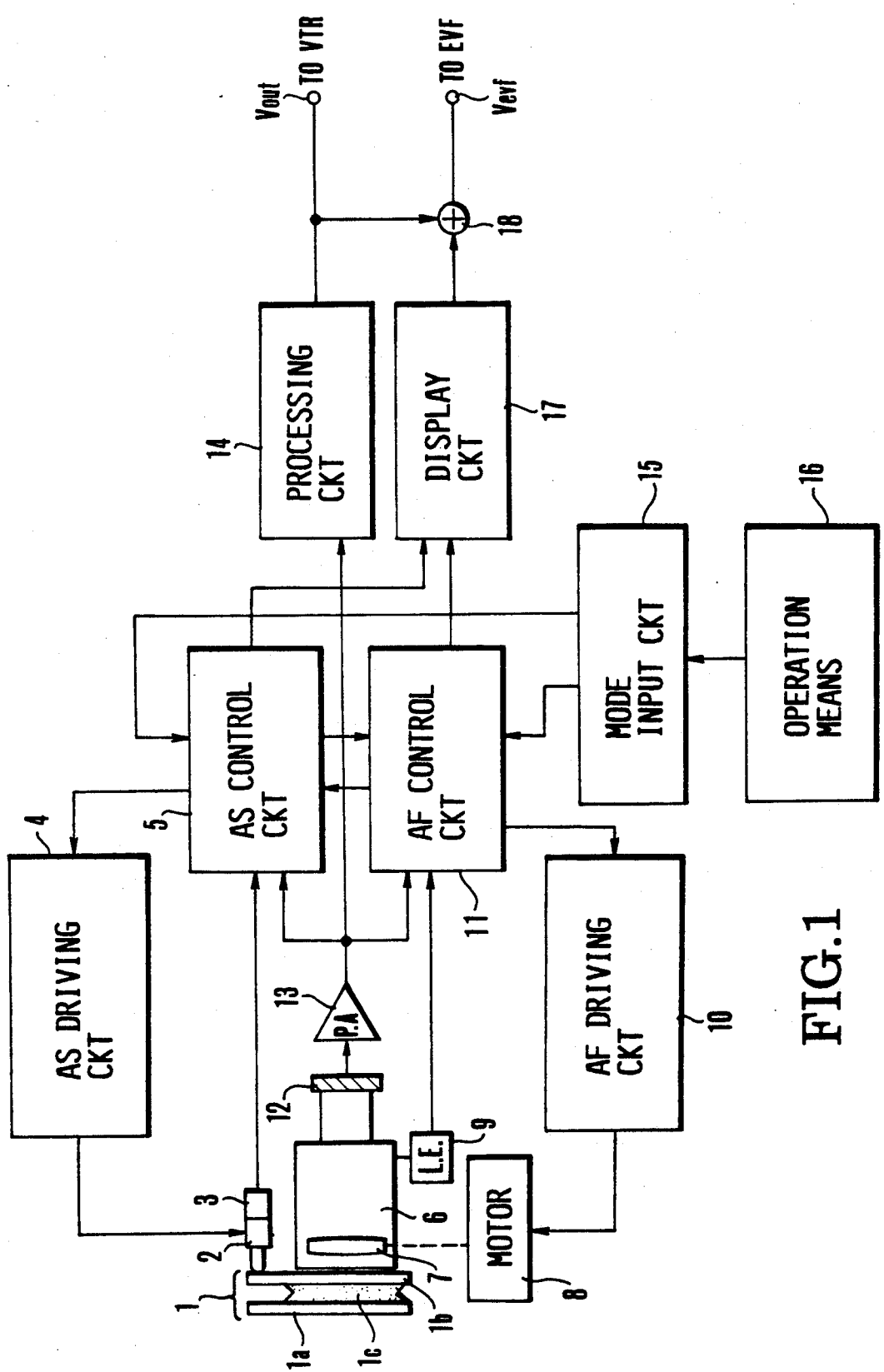
FIG. 1 is a block diagram showing an automatic image stabilization device arranged according to this invention as an embodiment thereof.
Figure 2:
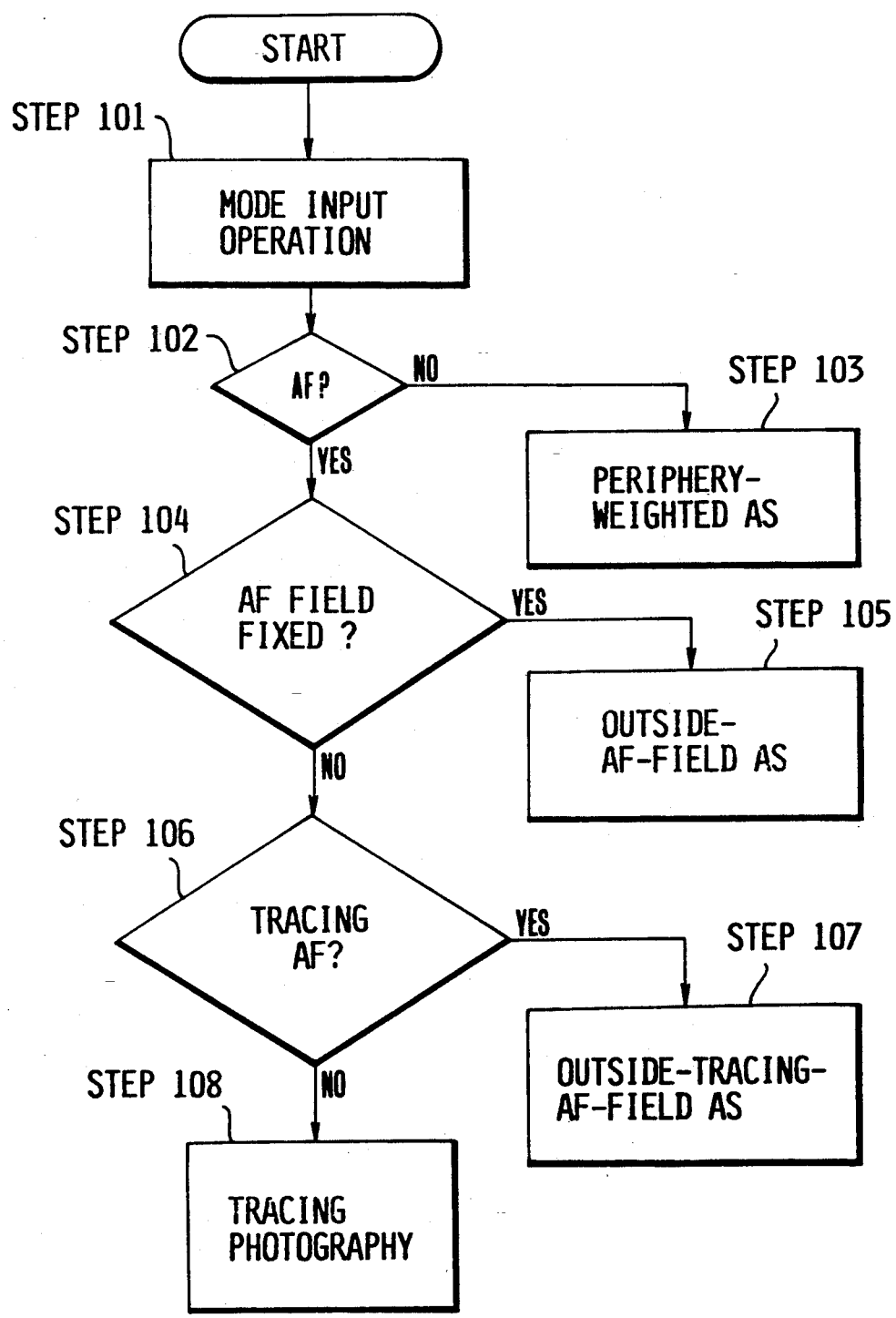
FIG. 2 is a flow chart showing the mode setting operation of the invented image stabilization device.
Figure 3:
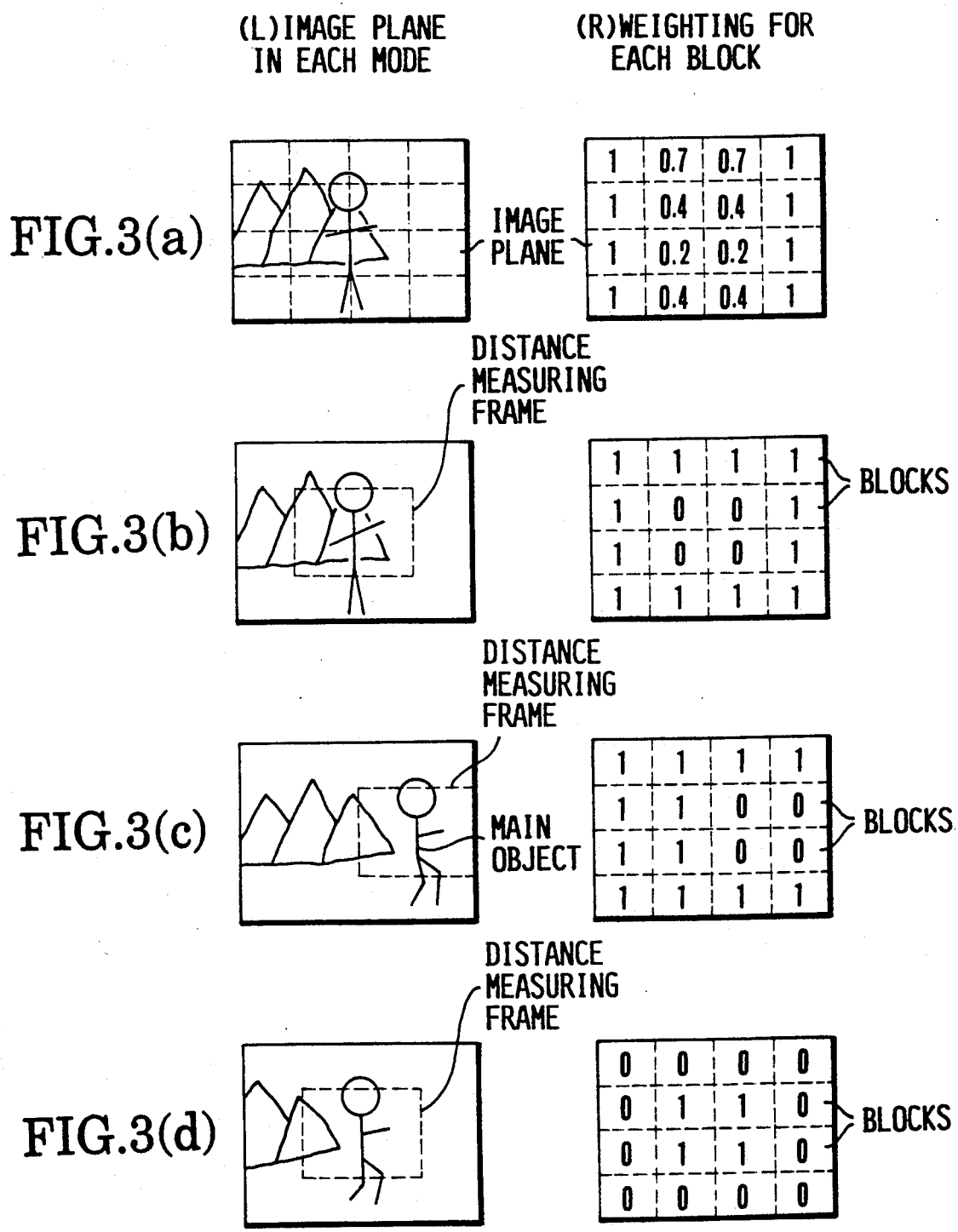
FIGS. 3(a) to 3(d) show the operation of an AS control circuit through the state of an image sensing plane obtained in each of different modes.
Figure 4:
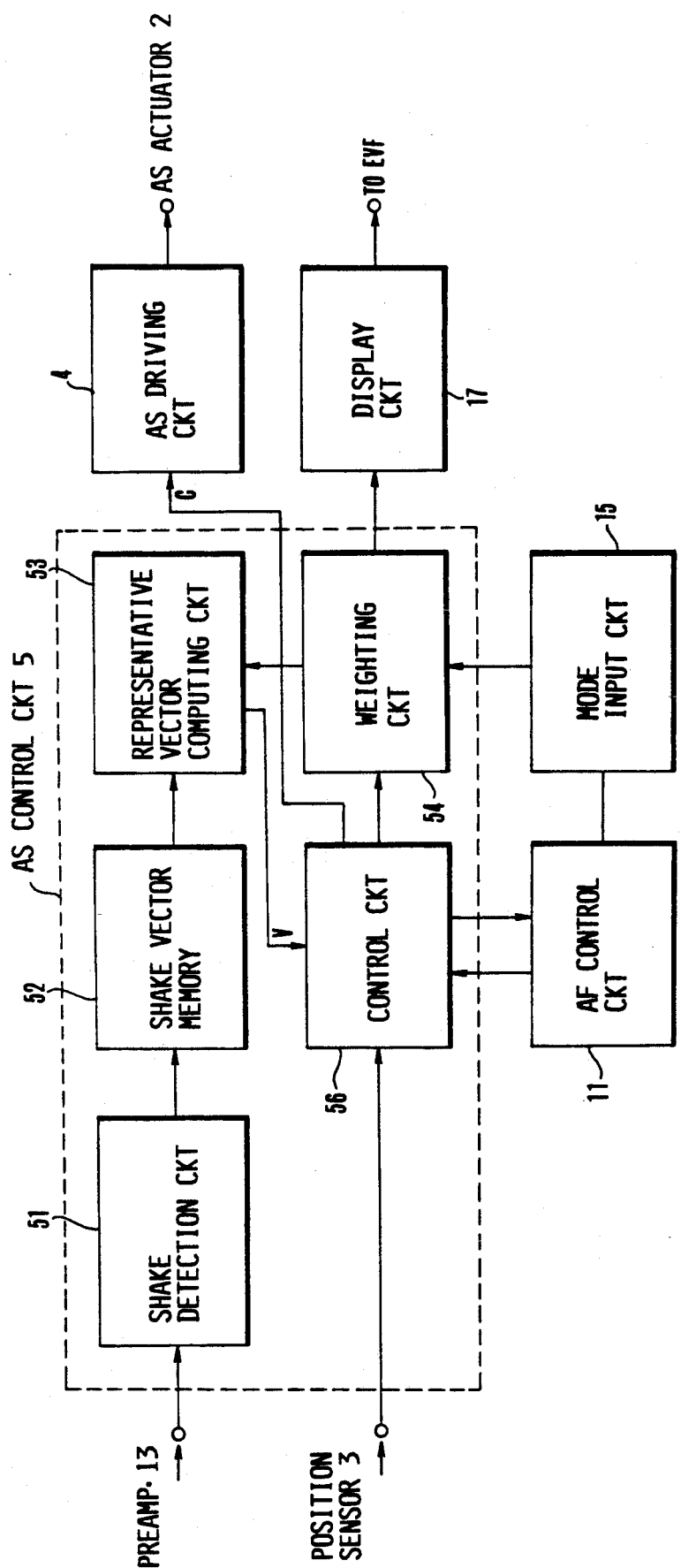
FIG. 4 is a block diagram showing the arrangement of the AS control circuit which is included in the block diagram of FIG. 1.
Figure 5A:
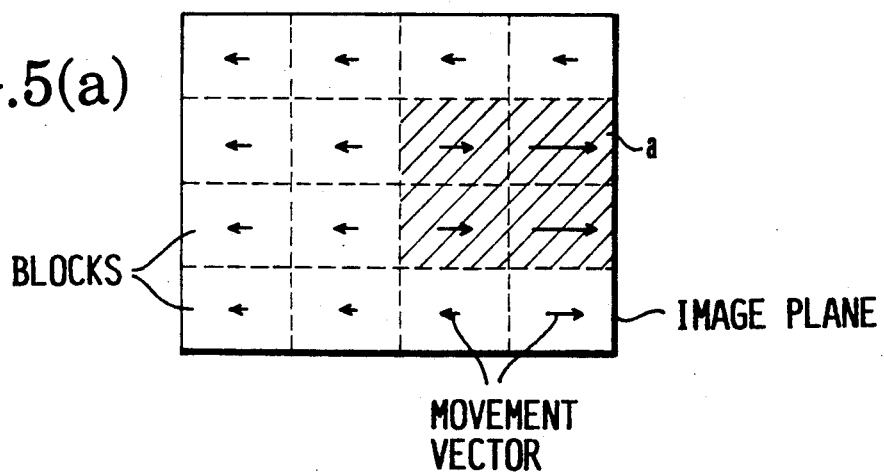
FIGS. 5(a) and 5(b) show the operation of the AS control circuit through movement vector distribution obtained on an image sensing plane.
Figure 5B:
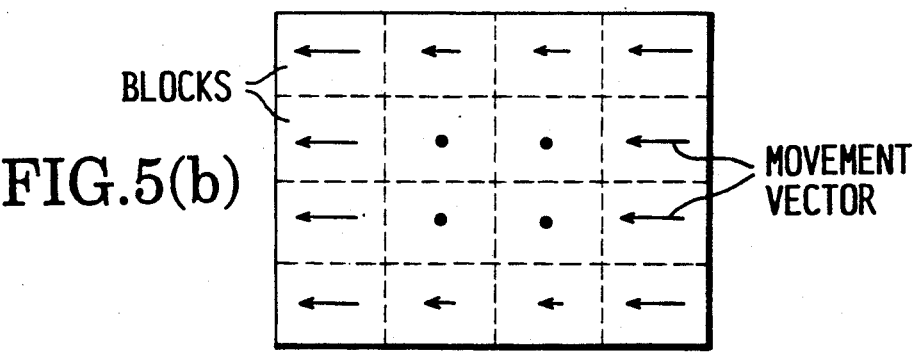
Figure 6A:
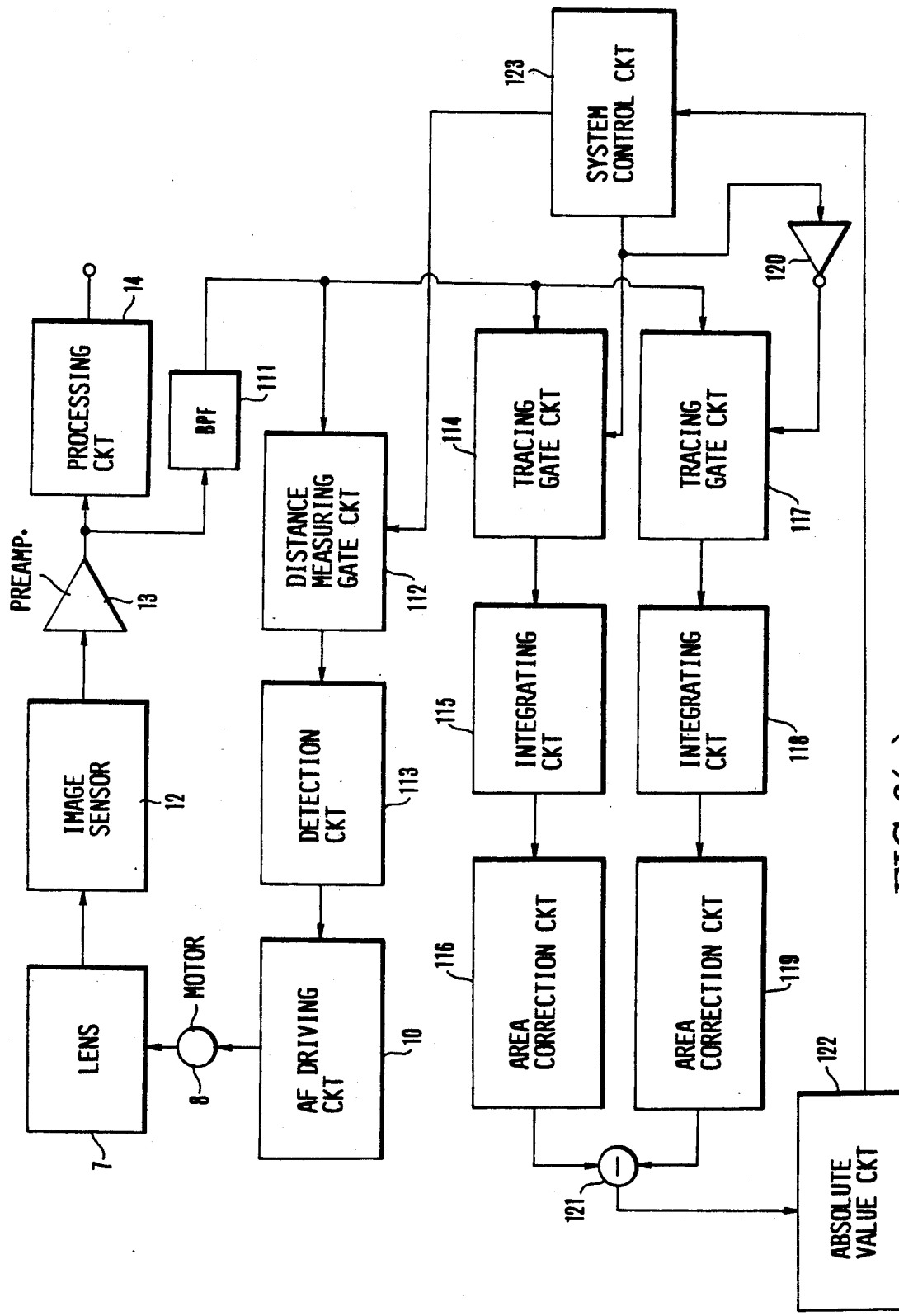
FIG. 6(a) is a block diagram showing the arrangement of the AF control circuit included in the block diagram of FIG. 1.
Figure 6B:
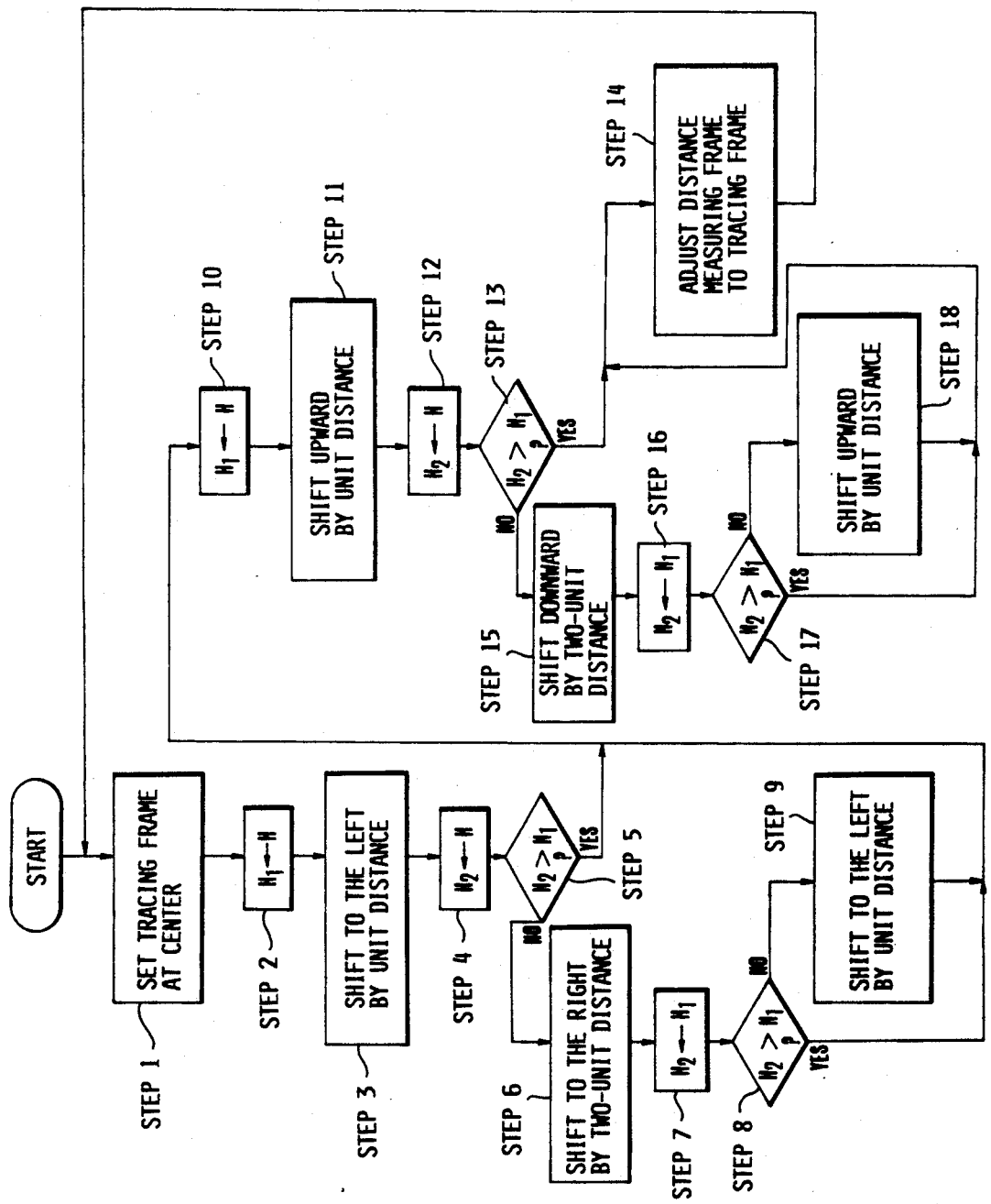
FIG. 6(b) is a flow chart showing the operation of the same AF control circuit.

The details of the automatic image stabilization device arranged according to this invention are as described below through an embodiment thereof with reference to the accompanying drawings:

FIG. 1 is a block diagram showing the automatic image stabilization device arranged according to the invention with the invention applied to a video camera as a first embodiment of the invention. FIG. 2 is a flow chart showing change-over of the operation modes of the automatic focusing (hereinafter referred to as AF) device and the automatic image stabilization (hereinafter referred to as AS) device of the video camera, i.e., the first embodiment, shown in FIG. 1. FIGS. 3(a) to 3(d) show the operation of the video camera in different modes through image planes obtained in the different modes. FIG. 4 is a block diagram showing the details of an AS circuit included in FIG. 1. FIGS. 5(a) and 5(b) show a movement vector memory showing image shakes. FIG. 6(a) is a block diagram showing the details of an AF control circuit. FIG. 6(b) is a flow chart showing the operation of the same AF control circuit.

Referring to FIG. 1, a variable angle prism (hereinafter referred to as VAP) 1 is arranged to vary the direction of the optical axis of a lens system. The VAP 1 is formed with a silicone rubber or a sealed liquid 1c inserted in between two transparent plates 1a and 1b of glass or the like. The direction of the photo-taking optical axis of light passing through the VAP 1 by an optical prism action is arranged to be variable by changing the paralleled degree of the two transparent plates by pushing the end part of the VAP 1. An AS actuator 2 such as a plunger or the like is arranged to change the direction of the optical axis by pushing the end part of the VAP 1. A position sensor 3 is arranged to detect the displacement of the VAP 1. An AS driving circuit 4 is arranged to drive the AS actuator 2. An AS control circuit 5 is arranged to stabilize an image by controlling the AS driving circuit 4 according to the shaking degree of the image to offset the image shake.

A lens unit 6 includes a zoom lens mechanism. A focusing lens 7 forms a part of the lens unit 6 and is arranged to adjust the focus of the lens unit. A motor 8 is arranged to change the position of the focusing lens 7. A lens encoder 9 is arranged to permit detection of the zooming state of the lens unit 6 including a focal length, the focusing lens position and an aperture value (F number). An AF driving circuit 10 is arranged to shift the position of the focusing lens 7 by driving the AF motor 8. An AF control circuit 11 detects the focused degree of the lens on the basis of a sensed image signal of the video camera and automatically adjusts the focus of the lens according to the focused degree detected.

An image sensor 12 is made of a CCD or the like and is arranged to convert into an electrical signal the image of a photographing object formed on its image sensing plane and to produce a sensed image signal. A preamplifier 13 is arranged to amplify to a given level the image signal produced from the image sensor 12. A processing circuit 14 is arranged to perform, on the sensed image signal produced from preamplifier 13, such signal processing actions as gamma correction, a blanking process, a synchronizing signal adding process, etc. and to produce from an output terminal Vout a TV signal. A mode setting circuit 15 is arranged to set one of operation modes including an AF (automatic focusing) mode and an AS (automatic image stabilizing) mode in response to an operation performed on a mode setting switch 16 which is provided for setting modes of varied kinds. A display circuit 17 is arranged to perform a signal processing action for displaying the operation modes of the AF control circuit 11 and the AS control circuit 5 at an electronic viewfinder (EVF) of the video camera which is not shown. A mixer 18 is arranged to mix the image signal produced from the processing circuit 14 and the display output signal produced from the display circuit 17 and to produce a mixture signal thus obtained from an output terminal Vevf.

Such being the arrangement, an object's image which comes through the variable angle prism 1 and the lens unit 6 to the image sensor 12 is converted into an image signal, and then the image signal is supplied to a monitor display device, a video recorder, etc. which are not shown through the preamplifier 13, the processing circuit 14 and the video output terminal. Further, the image signal produced from the preamplifier 13 is supplied to the AS control circuit 5 and the AF control circuit 11 to be used for image shake correction and automatic focusing.

Further details of the arrangement and the operation of the first embodiment are as follows: In FIGS. 3(a) to 3(d), a column (L) show an electronic viewfinder (EVF) image plane and another column (R) the states of divided areas obtained within the image plane.

The AF control circuit 11 has three operation modes, or a total of four modes including its relation to the AS action. A first mode is a manual focusing mode, in which the focus is adjusted by manually shifting the position of the focusing lens 7. A second mode is an AF mode in which an AF field is fixed. As shown in FIG. 3(b), column (L), an AF action is performed by using an image signal corresponding to an area within a distance measuring frame which is indicated by a broken line. A third mode is a tracing AF mode in which the position of the AF field, i.e., the distance measuring frame, changes following an object within the image plane accordingly as the object moves, as shown in FIG. 3(c), column (L).

In connection with the third mode, object tracing methods of varied kinds have been proposed for AF device. For example, an object tracing frame is set on the image sensing plane in a variable position. The lens is normally focused on a main object. A high frequency component of the image signal is thus normally obtained from the main object part to a greater degree than from the background part of the signal. In view of this, the object tracing frame is periodically shifted upward, downward, to the right and to the left. During this shifting process, the high frequency component (a luminance difference component) for the area within the tracing frame and the same component for the area outside the tracing frame are compared with each other. After this process, the object tracing frame is set in a position where the difference in the high frequency component between the inside and the outside of the tracing frame is obtained at a maximum value. This arrangement enables the tracing frame to always have the object within the frame by shifting its position.

Therefore, the focus can be kept on the main object irrespectively of the moving position of the object either by setting the distance measuring frame within the object tracing frame or by arranging the latter to serve also as the former.

FIG. 6(a) is a block diagram showing the details of the object tracing type AF circuit. FIG. 6(b) is a flow chart showing the operation of the AF circuit.

Referring to FIG. 6(a) which shows the internal arrangement of the AF control circuit 11, the image signal produced from the preamplifier 13 is supplied to a bandpass filter (BPF) 111. The BPF 111 detects a high frequency component of a given high frequency band. Then, a portion of the image signal corresponding to a part of the image plane designated by an AF gate circuit 112 for setting the distance measuring frame is alone allowed to pass through the gate circuit 112. The output of through the gate circuit 112 is supplied to a detection circuit 113 to undergo a detection process. The detection circuit 113 then produces a DC output at a DC level corresponding to the high frequency component. The DC level signal is then supplied to the AF driving circuit 10 which is arranged to drive the AF motor 8. The AF driving circuit 10 drives and controls the AF motor 8 to shift the position of the focusing lens 7 in such a way as to have the DC output of the detection circuit 113 produced at a maximum level. The AF control circuit 11 which is arranged in this manner is capable of causing the lens unit to be automatically focused on the main object in a continuous manner.

Further, the output of the BPF 111 is supplied to a tracing frame setting gate circuit 114 which is provided for setting the tracing frame on the image plane and also to an inverting gate circuit 120 which has a gate inverted through an inversion circuit 120 for the purpose of setting an area located outside the tracing frame on the image plane, i.e., an area other than the area within the tracing frame. These gate circuits extract the high frequency component of the signal portion obtained from within the tracing frame and the high frequency component of the signal portion obtained from the outside of the tracing frame respectively. Then, the outputs of these gate circuits 114 and 117 are integrated for one field period respectively by integrating circuits 115 and 118. After the integrating process, these high frequency components are supplied to area correction circuits 116 and 119. Following this, a difference in amount between the high frequency component resulting from a difference in area between the inside and the outside of the distance measuring frame is normalized by area correction circuits 116 and 119. The outputs of the area correction circuits are supplied to a subtracter 121 to obtain a level difference between them. The output of the subtracter 121 is supplied to an absolute value circuit 122 to obtain the absolute value of the level difference. The output of the absolute value circuit 122 is supplied to a tracing control circuit 123 which includes a microcomputer.

The tracing (or system) control circuit 123 operates as described below with reference to FIG. 6(b):

Step 1: After the start of control, the tracing frame is first set in its initial position which is in the central part of the image sensing plane. Step 2: A difference in high frequency component obtained in this position between the inside and the outside of the distance measuring frame, i.e., the output H of the absolute value circuit 122, is stored as a variable H1. Step 3: The gate circuit 114 is controlled to shift the tracing frame to the left as much as a unit distance. Step 4: The output H of the absolute value circuit 122 obtained in that position is stored as a variable H2. Step 5: The variables H1 and H2 are compared. If the variable H2 is larger than the variable H1, it indicates that the high frequency component difference between the inside and the outside of the tracing frame has been increased by the shift of position. Therefore, in that case, the flow of operation comes to a step 10 to adopt the new position as reference and to store the high frequency component difference H obtained in that position as the variable H1.

In case that the variable H2 is found to be equal to or smaller than the variable H1, the flow proceeds to a step 6. Step 6: The tracing frame is shifted to the right a two-unit distance. Step 7: The output H of the absolute value circuit 122 obtained in the new position is stored as the variable H2. Step 8: The variable H2 is compared with the variable H1. If the variable H2 is larger than the variable H1, the flow proceeds to the step 10. If the variable H2 is found to be either equal to or smaller than the variable H1, the flow comes to a step 9. Step 9: The tracing frame is shifted the unit distance to the left. The flow then comes to the step 10. Through these steps described, the object tracing frame is set in a position where the difference in the high frequency component between the inside and the outside of the frame is at a largest value.

At the step 10: The output H of the absolute value circuit 122 is newly stored as the variable H1. Step 11: the tracing frame is shifted the unit distance upward. The output H of the absolute value circuit 122 obtained with the frame in the new position is stored as the variable H2. Step 13: The variables H1 and H2 are compared with each other. If the variable H2 is found to be larger than the variable H1, the flow proceeds to a step 14. Step 14: The distance measuring gate circuit 112 is controlled to cause the distance measuring frame set in the position of the object tracing frame. Then the flow comes back to the step 2 to repeat the above-stated steps of operation. If the variable H2 is found to be equal to or smaller than the variable H1 at the step 13, the flow comes to a step 15. Step 15: The tracing frame is shifted downward by a two-unit distance. Step 16: The output H of the absolute value circuit 122 obtained at this new position is stored as the variable H2. Step 17: The variables H1 and H2 are compared. If the variable H2 is found to be larger than the variable H1, the flow comes to the step 14 to adjust the position of the distance measuring frame to that of the tracing frame and then comes back to the step 2. If the variable H2 is found at the step 17 to be equal to or smaller than the variable H1, the flow comes to a step 18 to shift the tracing frame the unit distance upward. After that, the flow comes to the step 14 to adjust the distance measuring frame to the object tracing frame and then comes back to the step 2 to repeat the steps described above.

The object tracing frame is thus arranged to be always shifted to a position where the difference in the high frequency component of signal between the inside and outside of the frame is at a maximum value. This enables the camera to follow the movement of the object. The position of the distance measuring frame is adjusted to the object so that the lens of the camera can be continuously focused on the object to be photographed.

The arrangement of the AF control circuit having the object tracing function is as described above.

Next, the arrangement and operation of the AS control circuit 5 is described as follows: The AS control circuit 5 divides the image sensing plane by four both in the vertical and horizontal directions into blocks as shown in FIGS. 3(a) to 3(d). The vector of image shaking is obtained for every one of these blocks. The vector according to the image shaking (hereinafter referred to as shake vector or movement vector) is obtainable in various manners. In one of such varied methods, a plurality of parts on the image plane is set as representative points and the feature of the image is sampled from these points. The feature thus obtained for one field is compared with the feature obtained for another field at a different point of time. The vector indicating a movement is then obtained from a change occurred in the correlation between feature points compared. The vector thus can be obtained by the so-called representative point matching method or the like.

FIG. 4 shows the internal arrangement of the AS control circuit 5. Referring to FIG. 4, a shake detection circuit 51 is arranged to extract the feature point of each block of the image plane out of an image signal produced from the preamplifier 13 and to obtain by computation the movement vector of each block by comparing the feature points extracted for one field image plane with the feature points extracted for another field image plane at a different point of time. A shake vector storing memory 52 is arranged to store one image plane amount of the shake (or movement) vector including the shake vector computed by the shake detection circuit 51 for every one of the divided blocks of the image plane. A representative vector computing circuit 53 is arranged to compute and compose shake (or movement) vector data on the blocks stored at the memory 52 according to a given algorithm and to produce one image plane amount of representative shake vector V. A weighting circuit 54 is arranged to attach weight to the shake vector of each block during the process of the composing action of the representative vector computing circuit 53 on the shake vector of the blocks according to the operation mode which will be described later. The information on the weight attaching action of the weighting circuit 54 is supplied to a display circuit 17. A mode input circuit 15 is arranged to instruct the weighting circuit 54 and the AF control circuit 11 for each operation mode. A control circuit 56 is arranged to supply shake correction information C to the AS driving circuit 4 for driving the AS actuator 2 on the basis of the representative shake vector V produced from the representative vector computing circuit 53, the output of the position sensor 3 of the AS actuator 2 and AF mode information obtained from the AF control circuit 11 in such a way as to have the image shaking offset by means of the variable angle prism 1. Further, the information on the image shake is sent from the control circuit 56 also to the AF control circuit 11.

The AS operation according to each of the AF operation modes is performed in the following manner:

(1) In the manual focusing mode (first mode):

In the manual focusing mode, information on the object to be photographed is not extractable from the AF control circuit 11. It is, therefore, difficult to distinguish the movement of the object from the shaking of the camera. In the case of photographing with a video camera or the like, the main object to be photographed is a moving object such as a person in general. The operator wishes to capture the main object in the central part of the image plane in many cases. Therefore, in detecting image shake information, weight is attached by the weighting circuit 54 to a greater degree to the shake vector of the peripheral portion of the image plane which has a less amount of movement as shown in FIG. 3(a), column (R), and the representative shake vector is computed by the representative vector computing circuit 53 under such a condition. In other words, as apparent from FIG. 3(a), column (R), the central part of the image plane having the main object as shown in FIG. 3(a), column (L) is weighted to a less degree than the peripheral part of the image plane for the purpose of lessening the adverse effect of the moving object. Further, the weight attaching rates (0.7, 0.4, ---) are arranged either to be automatically variable as desired according to the amount of the high frequency component of signal of the image plane detected by the AF control circuit 11 and the degree of definition or to be set at fixed values.

In the above-stated weighting operation, the AS driving circuit 4 is controlled in accordance with shake correcting information obtained by computation. The circuit 4 drives the AS actuator 2 to correct the image shake by acting on the variable angle prism 1.

Hereinafter the AS operation mode described above will be called "periphery-weighted AS".

(2) Distance measuring field fixing mode (second mode):

In cases where the AF operation is performed with the distance measuring field fixed in the central part of the image plane as shown in FIG. 3(b), column (L), the weighting circuit 54 performs its weight attaching action to set the weighting value of each block within the distance measuring frame at 0 and that of each block located without that frame at 1 in computing the representative shake vector V. Therefore, a shake correcting action is performed in accordance with only the information on the outside of the distance measuring frame. Hereinafter, this operation mode will be called as "outside-distance-measuring-frame AS".

(3) Tracing AF mode (third mode):

In the case of a tracing AF mode in which the AF operation is performed by tracing the movement of the object, it is highly probable that a moving main object is located within the distance measuring frame, like in the case of the second mode. Therefore, the representative image shake vector is computed by the vector computing circuit 53 by setting the weighting value at 1 for the blocks located outside the distance measuring frame. The image shake information is obtained on the basis of the shake vector thus obtained. The variable angle prism 1 is driven to make shake correction accordingly. Hereinafter, this AS operation mode will be called "outside-tracing-AF-distance-measuring-frame AS".

(4) Tracing photographing mode (fourth mode):

In a tracing photographing mode, the variable angle prism 1 is controlled in such a way as to keep the distance measuring frame of the tracing AF mode always in the central part of the image plane. In the motion picture photography, a still object is normally photographed as in a still state and a moving object as in a moving state. However, in some case, a moving object is photographed with the camera moved in such a way as to follow the object and to stably keep it within the image plane as shown in FIG. 3(d), column (L). A car race scene is an example of such. On that occasion, the tracing photographing mode stabilizes the image. Since the main object is required to be kept in the central part of the image plane of the camera, the representative movement (shake) vector is computed with the weighting value set at 1 for the inside of the relatively moving distance measuring frame and at 0 for the outside of the frame as shown in FIG. 3(a), column (R). Therefore, in this instance, the image shake correction is made on the basis of the object located within the distance measuring frame.

The actual shake vector distribution on the image plane is as follows: The output of the preamplifier 13 of the camera which enters the AS control circuit 5 is supplied to the shake detection circuit 51. The movement vector due to image shake of each block within the image plane is computed and composed. The value thus obtained is stored at the memory 52. In the third mode, i.e., the outside-tracing-AF-distance-measuring-frame AS mode as shown in FIG. 3(c), for example, the shake vector due to the movement of the main object saliently appears on the actual image plane in the case of an object's image located within the tracing AF distance measuring frame because the object is photographed in the moving state as indicated by an area a in FIG. 5(a). Meanwhile, the shake vector for the background located outside the distance measuring frame is very small and close to zero, because of the shake correction, i.e., by virtue of an automatic stabilizing action.

Further, in the tracing photographing mode shown in FIG. 3(d), column (L), i.e., in the fourth mode, the camera is moved to follow a moving main object and to keep the object in the central part of the image plane. In this instance, therefore, the shake vector of the inside of the distance measuring frame is kept to a value close to zero while the shake vector of the background in the blocks around the frame shows a large value as it is not used for the AS action as shown in FIG. 5(b).

In the cases of FIGS. 3(a) and 3(b) which differ from the modes of FIGS. 3(c) and 3(d), the blocks weighted to a great degree receive the shake correction while the blocks not weighted receive no shake correction. The shake vector comes to show a great value, in the same manner as in the cases of FIGS. 3(c) and 3(d).

Each shake vector on the image plane as shown in FIGS. 5(a) and 5(b) either may be stored at the shake vector memory 52 in a weighted state or may be stored without weighting. In the latter case, the vector is weighted after it is read out from the memory 52 and when the computing operation is performed to have the representative vector composed at the representative vector computing circuit 53.

Referring to FIG. 2, control over a mode setting action is performed as follows: FIG. 2 is a flow chart showing each operation mode setting process. At a step 101: After commencement of operation of the embodiment, the AF (or AS) mode is set by the mode input circuit 15. At a step 102: A check is made to find if the selected mode is the AF mode or a manual mode. In the event of the manual mode, the flow of operation comes to a step 103 to select the first mode which is the periphery-weighted AS mode. If the selected mode is found to be the automatic focusing (AF) mode at the step 102, the flow comes to a step 104. At the step 104: A selection is made between a fixed distance measuring frame and a movable distance measuring frame. In the case of the former, the flow proceeds to a step 105 to select the second mode which is the outside-distance-measuring-frame AS mode. If the latter is selected, the flow comes to a step 106 to determine whether the tracing AF is selected. If the tracing AF is selected, the flow proceeds to a step 107 to set the embodiment in the third mode which is the outside-AF-tracing-distance-measuring-frame AS mode. If the tracing AF is not selected at the step 106, the flow comes to a step 108 to set the embodiment in the fourth mode which is the tracing photographing mode.

Again referring to FIG. 4, further details of the operation of the AS control circuit 5 is as follows: When the embodiment begins to operate, the above-stated four modes are set by the mode input circuit 15 through the steps of the flow chart of FIG. 2 for the AF control circuit 11 and the AS control circuit 5. In response to the operation of the mode input circuit 15, the control circuit 56 changes the mode of the AF control circuit 16 from one mode over to another. At the same time, the control circuit 56 sets the weighting circuit 54 of the AS control circuit 5 as shown in the column (R) of FIGS. 3(a) to 3(d). Then, the representative vector computing circuit 53 obtains the movement or shake vector for the whole image plane taking the weighting coefficients and the number of blocks into consideration. Then, the variable angle prism (VAP) 1 is driven through the control circuit 56 and the AS driving circuit 4 in the direction of offsetting the shaking of the image. The control circuit 56 is arranged to receive from the AF control circuit 16 information on the position, size, etc. of the AF distance measuring frame. Further, information on the position of the AS actuator 2 is also supplied to the control circuit 56 from the position sensor 3. The position sensor 3 is provided for preventing the angle of the VAP 1 from being continuously shifted in a DC-like manner. The control circuit 56 determines a case where the AS operation is no longer required and, in that case, gradually brings the VAP 1 back into its normal initial state.

The display circuit 17 is arranged to display at the EVF either the AF distance measuring frame in a state of being mixed with the video signal or one of the above-stated four modes in the form of a symbol or the like.

The control circuit 56 may be arranged to contribute to the stabilization of the AF action by sending shake vector information to the AF control circuit 16.

In the first embodiment described above, the optical shake correcting method of using the VAP is employed by way of example. However, the invention is not limited to this method. The invention is also applicable to an electronic shake correcting method whereby information on the image obtained by the camera is temporarily stored in a field memory and a reading clock signal is shifted in such a manner as to offset a shake vector.

The automatic stabilization device according to the invention, as described in the foregoing, forms an automatic stabilizing system which, in detecting the shaking degree of images by detecting the movement vectors of a plurality of parts of an image plane, attaches weight to the detected vectors of movement taking place on the image place with the weighting degree varied according to the photographing conditions such as the operating mode of the AF (automatic focusing) device. This arrangement enables the embodiment to appositely select a shake correcting object under any photographing conditions, so that the stabilizing action can be performed by clearly distinguishing the movement of the whole camera from the movement of the object to be photographed. The device thus enables the camera to give a natural picture by correctly making a discrimination between a moving object and a stationary object.

Further, the state of the image sensing plane is determined through information on the object received from the automatic focusing device. The object of the AS (automatic stabilizing) action is selected and the weighting degree is controlled according to the state of the image sensing plane determined. Therefore, the embodiment is capable of performing optimum AS control, even in the case of a camera having an automatic tracing AF device, under any conditions, such as image shakes due to the movement of the object, that of the camera, and the moving object tracing movement of the camera to keep a moving object in the central part of the image plane.

In the foregoing, image shake detecting and correcting means which is arranged to detect the shaking of images by using an image signal on the basis of vector information on the movement taking place on the image sensing plane has been described. However, there is some image pattern that prevents the movement of the object's image from being adequately distinguished from the movement of the camera by the use of the shake information obtained from the image signal alone.

In view of this, a second embodiment which will be described below employs electronic shake detecting means using an image signal in combination with such an external sensor as an acceleration sensor or the like. In cases where increases in the number of parts, in cost and in space due to the use of the external sensor are permissible, the second embodiment ensures accurate detection of the shaking of the camera with a high degree of reliability even in cases where the shaking of the camera is not accurately detectable from the image signal.

Figure 7:
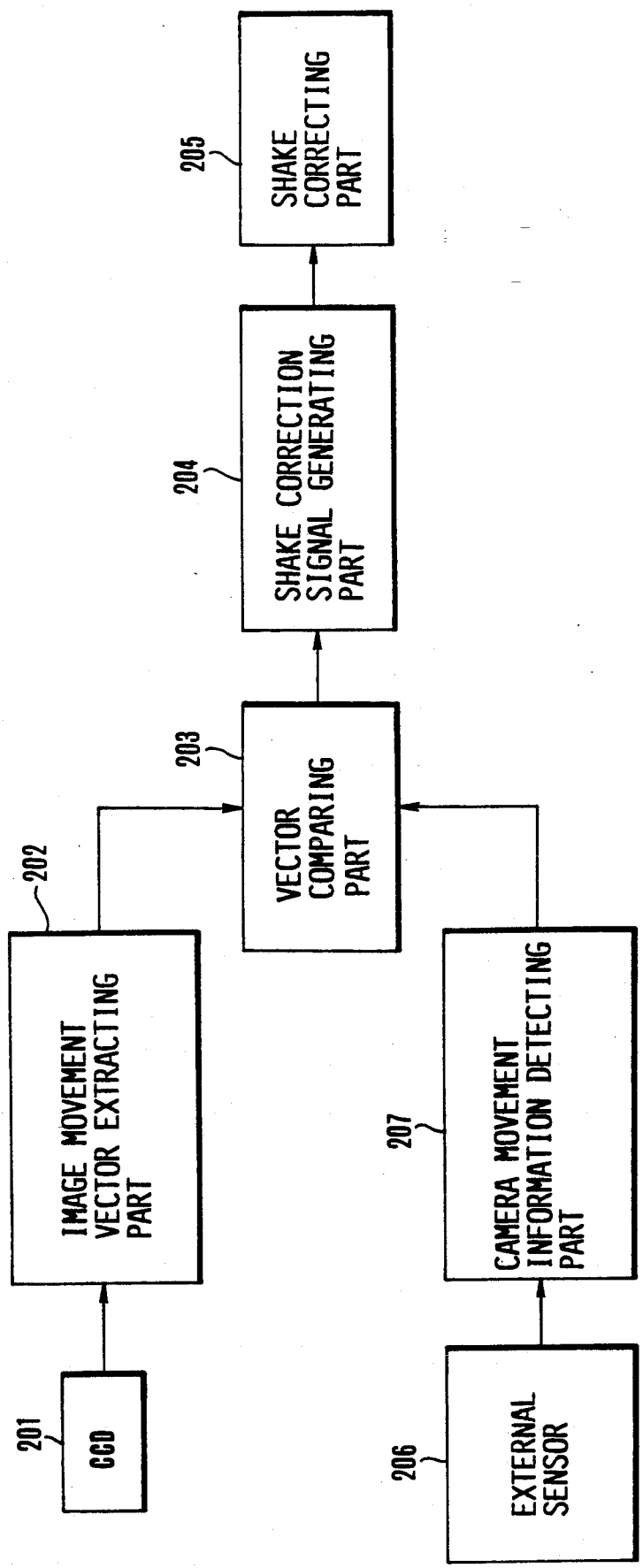
FIG. 7 is a block diagram showing the fundamental arrangement of an image shake correction system of an image sensing apparatus arranged according to this invention.

FIG. 7 shows the basic arrangement of the shake correction system of an image sensing apparatus (or a video camera) arranged as the second embodiment of the invention. Referring to FIG. 7, an image sensor 201 is composed of a CCD or the like. An image movement vector extracting part 202 is arranged to extract an image movement vector from a video signal produced by the image sensor 201. The vector of movement of the camera is detected by means of the image sensor 201 and the vector extracting part 202. Meanwhile, a camera movement information detecting part 207 is arranged to detect information on the movement of the camera on the basis of the output of an external sensor 206. The camera movement vector is thus detected jointly by the external sensor 206 and the camera movement information detecting part 207. A vector comparing part 203 which is arranged to compare these camera movement vectors computes and obtains a movement vector representing an image shake component. The output of the comparing part 203 is supplied to a shake correction signal generating part 204. The part 204 produces a shake correction signal for offsetting the movement vector representing the image shake. This signal is supplied to a shake correcting part 205. The shake correcting part 205 then shifts the position of a lens system in the direction of correcting the shake.

Figure 8:
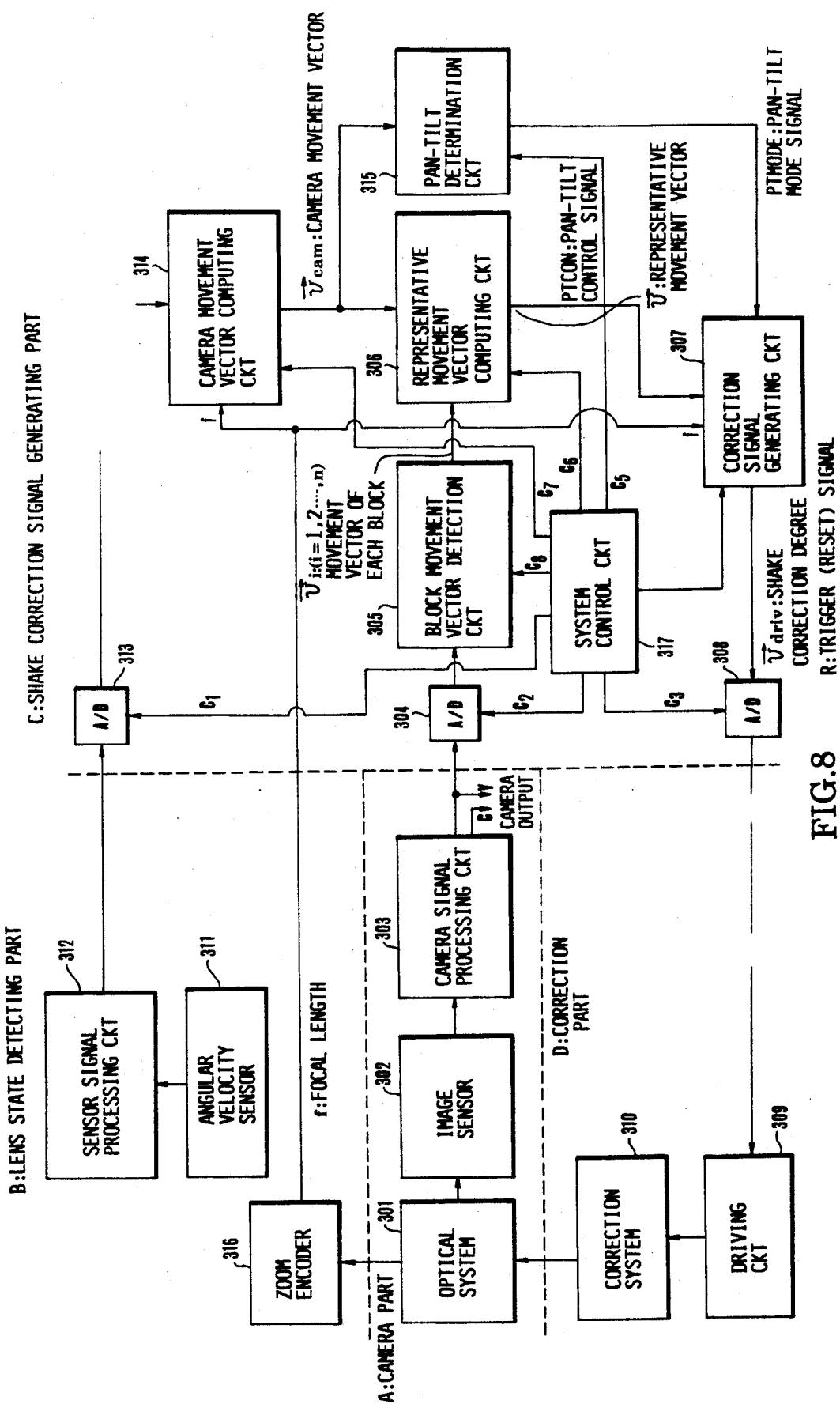
FIG. 8 is a block diagram showing the details of the block diagram of FIG. 7.

FIG. 8 is a block diagram showing by way of example the details of the above-stated shake correction system of the image sensing apparatus arranged as the second embodiment of this invention. The embodiment comprises a camera part A; a lens state detecting part B; a shake correction signal generating part C; and a correction part D.

The camera part A consists of a photo-taking lens system 301 which includes a photo-taking lens and is arranged to form an image of a photographing object on the image sensing plane of an image sensor 302; the image sensor 302 which is made of a CCD or the like and is arranged to convert into an electrical signal the object signal formed on the image sensing plane by the photo-taking lens system 301; and a camera signal processing circuit 303 which is arranged to read out the electrical signal produced by the image sensor 302, to perform a signal processing action in a prescribed manner on the electrical signal produced from the image sensor 302 and to produce a luminance signal Y, a chrominance signal C, etc..

In the lens state detecting part B: An angular velocity sensor 311 is mounted on the camera. The manner in which the sensor 311 is mounted is not shown. A sensor signal processing circuit 312 is arranged to perform a prescribed signal processing action on the output of the angular velocity sensor 311 and to produce angular velocity information corresponding to the shaking degree of the camera detected. A zoom encoder 316 is arranged to detect information on the focal length of the lens resulting from the zooming action on the lens in case that the lens system includes a zoom lens.

In the shake correction signal generating part C: An analog-to-digital (A/D) converter 304 is arranged to convert the video signal produced from the camera signal processing circuit 303 into a digital signal in units of one field or one frame. A block movement vector detection circuit 305 is arranged to divide one A/D converted image plane into an n number of blocks; to compare the digital data of each block with that of the corresponding block of the preceding field image plane; and to obtain the block movement vector $\vec{vi}$ (i=1, 2, ---, n) of each block from a discrepancy occurred between representative points on the two image planes compared. An A/D converter 313 is arranged to convert the angular velocity information from the sensor signal processing circuit 312 of the lens state detecting part B into a digital signal. A camera movement vector computing circuit 314 is arranged to compute the movement vector $\vec{vcam}$ of the camera caused by the shaking of the camera, etc. according to the following formula on the basis of the digital angular velocity information produced from the A/D converter 313 and the focal length information of the lens obtained from the zoom encoder 316:

$$\vec{vcam} = f \cdot \tan\left(\bar{\omega} \cdot \frac{1}{60}\right)$$

wherein
f: focal length (mm)
$\bar{\omega}$: angular velocity (rad/s)

A representative vector computing circuit 306 is arranged to compute and estimate the image movement vector $\vec{vi}$ (i=1, 2, ---, n) and the camera movement vector $\vec{vcam}$ produced from the camera movement vector computing circuit 314 and to produce a representative vector $\vec{v}$ which represents an overall movement of the image plane and a pan-tilt control signal PTCONT which is to be used for controlling panning-tilting mode determination as will be described later. The algorithm of the computing operation of the circuit 306 will be also described later. A pan-tilt determination circuit 315 is arranged to determine whether the camera movement is resulting from a panning or tilting operation by comparing the camera movement vector $\vec{vcam}$ of each field with that of another field and to produce a pan-tilt mode signal PTMODE which indicates the result of the determination. The pan-tilt determination circuit 315 produces the pan-tilt mode signal PTMODE at a value "0" for normal photographing and at a value "1" in case that the direction of the camera movement vector remains unchanged for more than a given consecutive number of fields thus indicating that a pan-tilt mode has begun. The signal PTMODE is continuously produced at "1" until the camera movement vector comes to reverse its direction.

A correction signal generating circuit 307 is arranged to compute an overall shaking degree using the focal length information f received from the zoom encoder 316, the pan-tilt mode signal PTMODE from the pan-tilt determination circuit 315, the representative movement vector $\vec{v}$ from the representative movement vector computing circuit 306 and the pan-tilt control signal PTCONT and to produce a shake correction signal $\vec{vdriv}$ which corresponds to the computed overall shaking degree and a trigger signal R which resets the optical axis turning means of the correction part D to its initial position. A digital-to-analog (D/A) converter 308 is arranged to convert the shake correction signal vdriv and the trigger signal R into analog signals for controlling the correction part D.

A system control circuit 317 includes a microcomputer and is arranged to control and cause the whole system as well as each of the circuits disposed within the shake correction signal generating part C to operate at predetermined timing by producing control signals C1 to C8 therefrom.

In the correction part D: A driving circuit 309 is arranged to drive a correction system 310 according to a signal obtained by D/A converting the shake correction signal $\vec{vdriv}$ which is produced from the correction signal generating circuit 307 of the correction signal generating part C. The correction system 310 includes among others a lens position control mechanism such as optical axis turning means which is not shown but is disposed within the lens system. The correction system 310 operates these components in accordance with the output of the driving circuit 309 to shift the position of the lens system in the direction of correcting the shaking of the image plane.

Figure 9A:
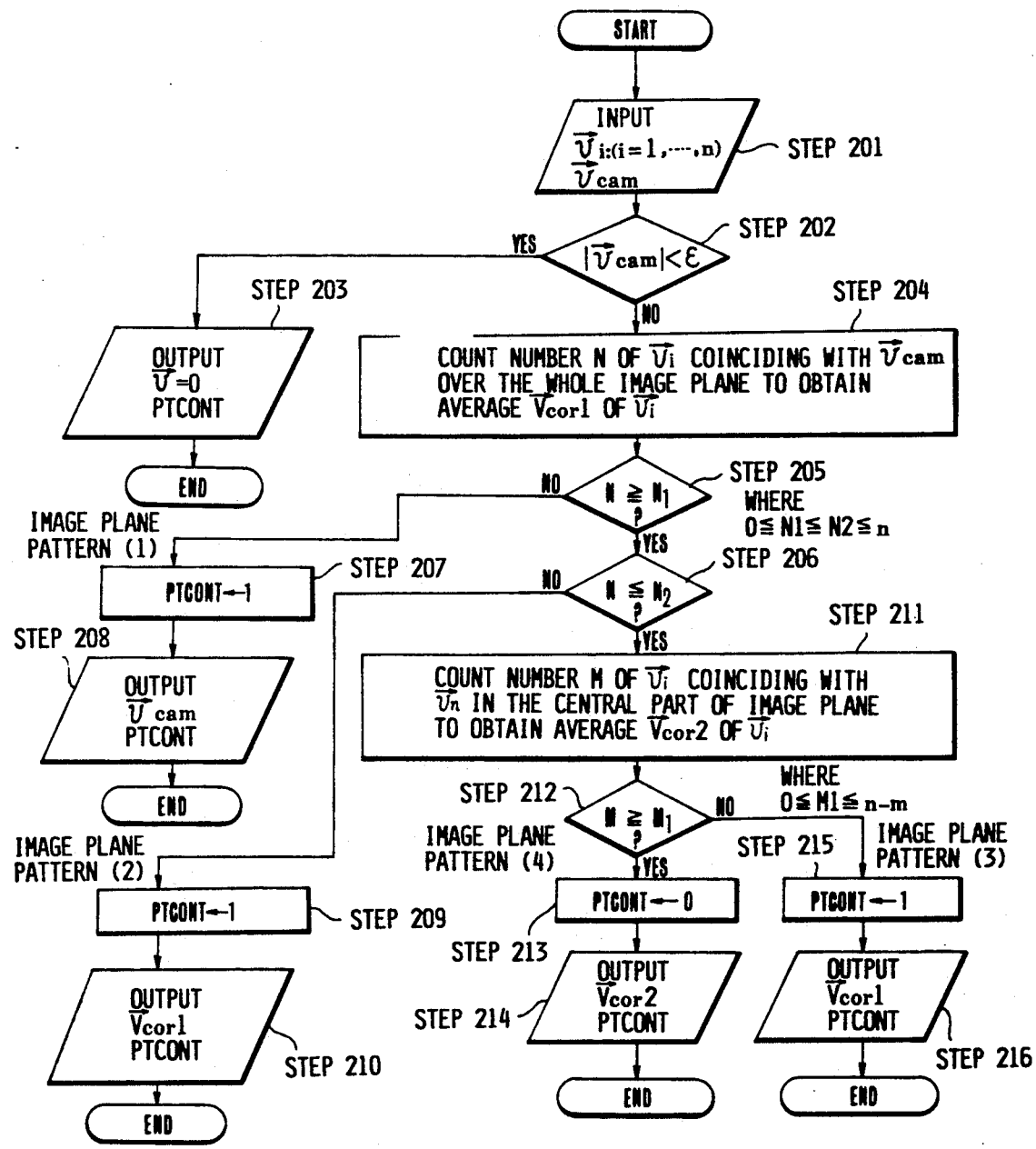
FIG. 9(a) is a flow chart showing the computing algorithm of a representative movement vector computing circuit which is included in the block diagram of FIG. 8.
Figure 9B:
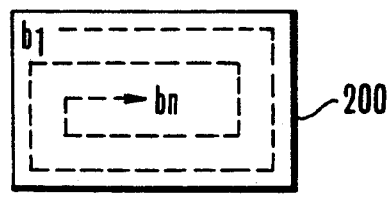
FIG. 9(b) shows the state of a movement vector detection block set on an image sensing plane.
Figure 9C:
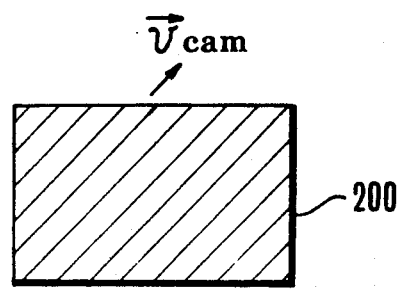
FIGS. 9(c) and 9(d) show sensed image patterns to be used for the description of the computation flow chart of FIG. 9(a).

The main blocks in the block diagram of the image sensing apparatus which is arranged as the second embodiment as mentioned in the foregoing are described in further detail as follows:

FIG. 9(a) is a flow chart showing the algorithm for computing the representative image movement vector $\vec{v}$ and the pan-tilt control signal PTCONT at the representative movement vector computing circuit 306 within the shake correction signal generating part C. Referring to the flow chart, the algorithm is described as follows:

At a step 201: The computing circuit 306 receives the movement vector $\vec{vi}$ (i=1, 2, ---, n) of each of an n number of blocks bi set on the image sensing plane and the camera movement vector $\vec{vcam}$. These blocks are numbered in a helical order beginning from the upper left part of the image plane 200 as b1, b2, --- and bn, as shown in FIG. 9(b). The n-th block bn is located in the central part of the image plane. At a step 202: The size of the camera movement vector is checked and estimated. If the vector $|\vec{vcam}|$ is estimated to be smaller than a given value $\epsilon$, the flow of operation proceeds to a step 203 to set the representative movement vector $\vec{v}$ at 0 and to bring a correcting action to a stop. In other words, the movement of the camera is considered to be small enough requiring no correction.

If the camera movement vector $|\vec{v}\text{cam}|$ is found to be equal to or larger than the given value $\epsilon$ at the step 202, the camera is considered to be shaking and the flow comes to a step 204. At the step 204: The movement vector $\vec{v}i$ of every one of all the blocks of the image plane 200 is compared with the camera movement vector $\vec{v}\text{cam}$, as shown in FIG. 9 (c). The number of the block vectors $\vec{v}i$ which coincide with the camera movement vector $\vec{v}\text{cam}$ and the average vector $\rightarrow\vec{V}\text{cor}1$ of them are computed.

The flow proceeds to steps 205 and 206 to compare with given values N1 and N2 the number N of the block movement vectors $\vec{v}i$ that coincide with the camera movement vector $\vec{v}\text{cam}$. The values N1 and N2 are set to be in the following relation:

$0 \leq N1 \leq N2 \leq n$ (number of blocks on the image plane)

In the case of an image plane pattern (1) having a very small number N of block movement vectors coinciding with the camera movement vector cam thus showing a relation of $0 \leq N \leq N1$, the flow proceeds to a step 207. At the step 207: The pan-tilt control signal PTCONT is set at "1" and the flow comes to a step 208. Step 208: The camera movement vector $\vec{v}\text{cam}$ is produced as the representative vector $\vec{v}$ and the pan-tilt control signal PTCONT is produced at "1". In the event of an image plane pattern (2) where a very large number N of the block movement vectors coincide with the camera movement vector $\vec{v}\text{cam}$ and $N > N2$, the flow comes to a step 209. At the step 209: The pan-tilt control signal PTCONT is set at "1" and the flow comes to a step 210. At the step 210: The average vector $\rightarrow V\text{cor}1$ which is obtained at the step 204 is produced as the representative movement vector $\vec{v}$ and, at the same time, the pan-tilt control signal PTCONT is produced at "1".

Further, the details of the vectors obtained on the image sensing plane in the image plane patterns (1) and (2) mentioned above will be described later.

Figure 9D:
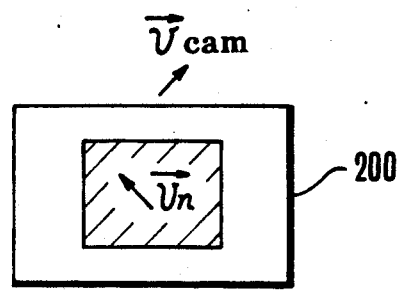

In case that the number N of block movement vectors $\vec{v}i$ coinciding with the camera movement vector $\vec{v}\text{cam}$ is at a value between the values N1 and N2, the flow comes to a step 211. At the step 211: The number M of block movement vectors $\vec{v}i$ ($i = m \cdots n-1$) which coincide with an image plane center movement vector $\vec{v}h$ and are located in the central part of the image plane is computed and the average vector $\rightarrow V\text{cor}2$ of them is also obtained along with the number M. At a step 212: The number M which is obtained at the step 211 is compared with a given value M1. In the event of an image plane pattern (3) wherein the number M is smaller than the value M1, the flow comes to a step 215. Step 215: The pan-tilt control signal PTCONT is set at "1" and the flow comes to a step 216. At the step 216: The average vector $\rightarrow V\text{cor}1$ of the block movement vectors $\vec{v}i$ coinciding with the camera movement vector $\vec{v}\text{cam}$ is produced as the representative vector $\vec{v}$. The pan tilt control signal PTCONT which is set at "1" is also produced. If the number M is found to be equal to or larger than the given value M1 at the step 212, thus showing an image plane pattern (4), the flow comes to a step 213. Step 213: The pan-tilt control signal PTCONT is set at "0". Step 214: The average vector $\rightarrow V\text{cor}2$ of the block movement vectors $\vec{v}i$ coinciding with the image plane center movement vector $\vec{v}h$ is produced as the representative movement vector $\vec{v}$. The pan-tilt control signal PTCONT which is set at "0" is also produced. The above-stated given value M1 is a constant set within the following range:

$0 \leq M1 \leq n-m$ wherein m represents the number assigned to the first block in the central area of the image plane as shown in FIG. 9(d).

Referring to FIGS. 10(a) and to 10(e), the states of block vectors obtained on the image plane in the four different image patterns are as described below:

1) In the image plane pattern (1), $N < N1$:

In this case, a very few number of the block movement vectors $\vec{v}i$ ($i = 1, 2, \cdots, n$) obtained on the image plane coincide with the camera movement vector $v\text{cam}$. This indicates that the movement of the object is larger than that of the camera. In this instance, two different cases are conceivable. In one case, every block movement vector differs from the camera movement vector $\vec{v}\text{cam}$ as shown in FIG. 10(a). In the other case, every block movement vector $\vec{v}i$ coincides with a direction which differs from the camera movement vector $\vec{v}\text{cam}$ as shown in FIG. 10(b). In the case of FIG. 10(a), the image plane pattern suggests a scene where small objects are moving in different directions respectively. The image plane pattern of FIG. 10(b) suggests a movement in one direction of an object occupying a large portion of the image plane. An intermediate state between the states of FIGS. 10(a) and 10(b) is also conceivable.

2) In the image plane pattern (2), $N > N2$:

A great number of block movement vectors $\vec{v}i$ coincide with the camera movement vector $\vec{v}\text{cam}$. In other words, the image movement is due to the shaking of the camera while the object little moves. As shown in FIG. 10(c), the movement vector $\vec{v}i$ of every block is in nearly the same direction as the camera movement vector $\vec{v}\text{cam}$.

In the cases of the image plane patterns (3) and (4), they are intermediate between the above-stated image plane patterns (1) and (2). The image plane is affected about the same degree by the movement of the camera and that of the object. As shown at the step 212 and ensuing steps of the flow of operation, the states of the image plane can be further divided according to the condition of the object to be photographed.

3) In image plane pattern (3), $M < M1$:

Since the image plane pattern differs from the image plane patterns (1) and (2), the object is assumed to be located mainly in the central part of the image plane. As mentioned in the foregoing with reference to FIG. 10(d), the number M of the block movement vectors $\vec{v}i$ ($i = m, m+1, \cdots, n-1$) which are located in the central part of the image plane and coincide with the image plane center movement vector $\vec{v}h$ is obtained and also the average vector $\rightarrow V\text{cor}2$ of them is obtained. Then, the data thus obtained is examined to determine whether the intended object exists in the central part or not. More specifically, if the number M is found to be less than the given value M1 as in the case of the image plane pattern (3), the intended object is considered to be not located in the central part of the image plane. In that instance, the average vector $\rightarrow V\text{cor}2$ is produced as the representative movement vector $\vec{v}$.

4) In the case of image plane pattern (4), M ≧ M1:

In this case, the intended object is located in the central part of the image plane. As shown in FIG. 10(e), an object's movement vector which differs from the camera movement vector $\vec{v}$cam fixedly exists in the central part of the image plane. The average vector →Vcor2 of all the block movement vectors $\vec{v}$i that coincide with the movement vector $\vec{v}$n of the center block bn located in the central area of the image plane is produced as the representative movement vector $\vec{v}$.

Among the four image plane patterns, the representative movement vector is obtained on the basis of the camera movement vector $\vec{v}$cam in the cases of the patterns (1), (2) and (3). Therefore, they require detection of an intentional camera moving operation such as panning or tilting. However, in the image plane pattern (4), such detection is not necessary as the movement vector which is obtained on the basis of the object's movement is used as the representative movement vector. Therefore, in the cases of image plane patterns (1), (2) and (3), the pan-tilt control signal PTCONT is produced at "1" which indicates the necessity of considering the panning or tilting. Further, in the case of the image plane pattern (4), the pan-tilt control signal PTCONT is produced at "0" which indicates no consideration for panning or tilting, as no consideration of panning or tiling is necessary in this instance.

Therefore, in the cases of the image plane pattern (1), (2) or (3), panning or tilting is detected. Depending on the state of the pan-tilt mode signal PTMODE, the shake correcting action is performed according to the image movement when no panning nor tilting is performed. In the event of panning or tilting, the shake correcting action is not performed. Whereas, in the case of the image plane pattern (4), the shake correcting action is performed irrespectively of the pan-tilt mode signal PTMODE as the image pattern is not influenced by penning or tilting.

Figure 11:
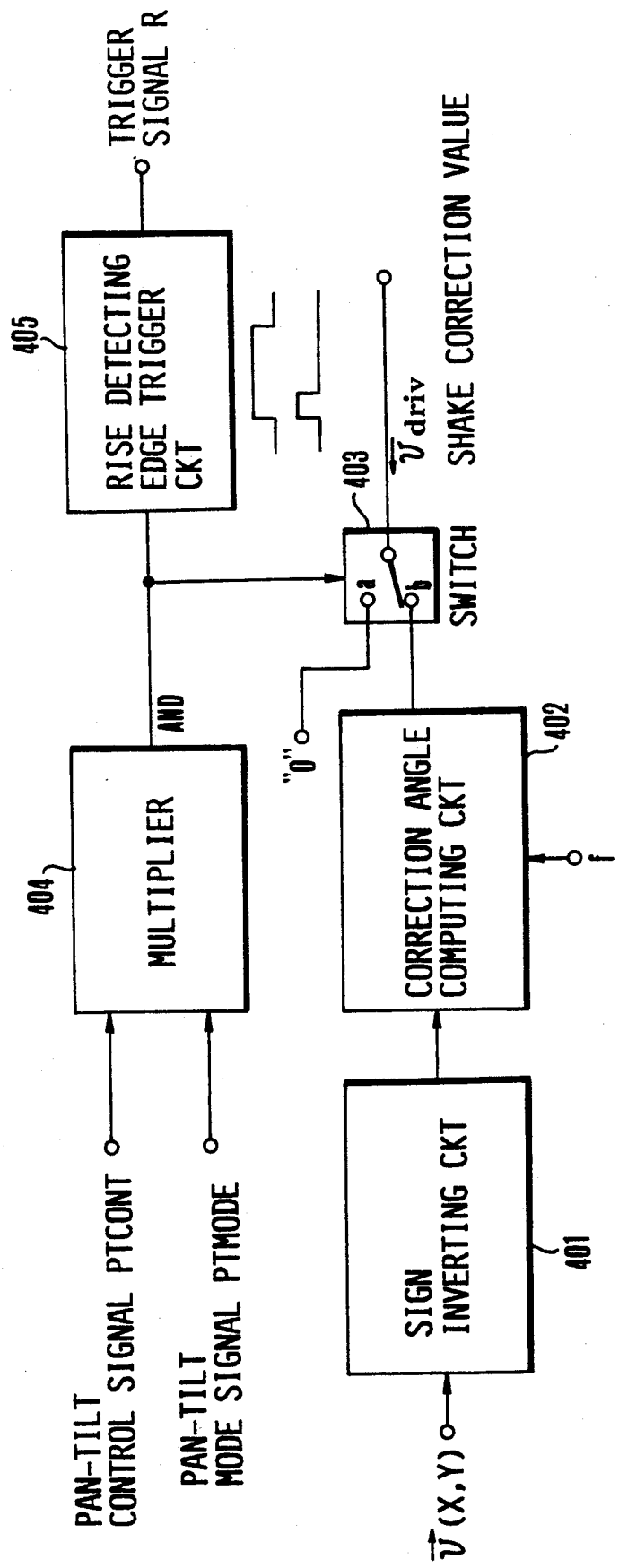
FIG. 11 is a block diagram showing the internal arrangement of a correction signal generating circuit included in the block diagram of FIG. 8.

Referring to the block diagram of FIG. 8, the shake correction signal generating circuit 307 which receives the representative movement vector $\vec{v}$ from the representative movement vector computing circuit 306 and the pan-tilt control signal PTCONT is arranged and operates as described below:

FIG. 11 is a block diagram showing the internal arrangement of the correction signal generating circuit 307. Referring to FIG. 11, the representative movement vector $\vec{v}$ (x, y) coming from the representative movement vector computing circuit 306 is supplied to a sign inverting circuit 401 to have its sign inverted there. A correction angle computing circuit 402 is arranged to compute a lens correction angles θyaw and θpitch, which are for correction in the directions of yawing and pitching respectively. These lens correction angles are computed and obtained according to the following formulas and a shake correction signal $\vec{v}$driv is produced as a result:

$$\theta_{yaw} = \tan^{-1}\left(\frac{-x}{f}\right)$$

$$\theta_{pitch} = \tan^{-1}\left(\frac{-y}{f}\right)$$

wherein, f represents a focal length and x and y horizontal and vertical components of movement vector $\vec{v}$.

A multiplier 404 is arranged to produce a signal of a logical product (AND) obtained on the basis of the pan-tilt control signal PTCONT produced from the representative movement vector computing circuit 306 and the pan-tilt determination signal PTMODE produced from the pan-tilt determination circuit 315. FIG. 12 shows the AND output logical values obtained under the different image plane conditions (or patterns) (1) to (4) mentioned in the foregoing. The AND output of the multiplier 404 is used as a change-over control signal for a switch 403. When the AND output is at "0", the connecting position of the switch 403 is shifted to a contact "b" to produce the shake correction signal $\vec{v}$driv which is obtained on the basis of the above-stated correction angles θyaw and θpitch produced from the correction angle computing circuit 402. When the AND output of the multiplier 404 is at "1", the position of the switch 403 is shifted to another contact "a" to have the shake correction signal produced at "0".

A rise detecting edge trigger circuit 405 is arranged to produce a trigger signal R when the output of the multiplier 404 changes from "0" to "1". This trigger signal indicates that the camera has come into the pan-tilt (panning or tilting) mode. However, when the pan-tilt mode is detected, the lens system has already been corrected to an extent corresponding to several fields in one direction by correcting means. If the correcting means is stopped from operating in its position obtained under that condition, the area correctable by the correcting means would be biased in one direction to make correction difficult after completion of the panning or tilting operation.

To solve this problem, the optical turning means which is included in the correction system 310 is arranged to be brought back to its initial position by the driving circuit 309 at a speed inconspicuous to the visual sensations when the above-stated trigger signal is produced. Therefore, the shake correcting action always begins from the initial position after completion of the panning or tiling operation. This arrangement thus ensures a maximum correction range.

Referring to FIG. 12, the action of the representative movement vector computing circuit 306 and that of the correction signal generating circuit 307 can be recapitulated as follows:

In the case of the image plane pattern (1), (2) or (3): The movement vector $\vec{v}$i of each block on the image plane is obtained under the influence of the movement of the camera. Hence, the possibility of panning or tilting must be taken into consideration. In this case, therefore, the pan-tilt control signal PTCONT is set at "1" to have the pan-tilt determination signal PTMODE of the pan-tilt determination circuit 315 taken into consideration. As a result, the AND output can be obtained at a value corresponding to the signal PTMODE. Therefore, when the signal PTMODE is at "1" with panning or tilting performed, the embodiment makes no shake correction. If no panning nor tilting is performed and the signal PTMODE is at "0", the embodiment makes shake correction.

In the event of the image plane pattern (4): The influence of the camera movement is negligible. The movement vector of the object is used as the representative movement vector. No consideration is required for the pan-tilt mode determination signal PTMODE. The pan-tilt control signal PTCONT is set at "0" and the AND output is produced at "0". In short, the embodiment always makes shake correction in this instance.

In the image sensing apparatus which is arranged as the second embodiment of this invention, the movement of the camera is detected by means of the angular velocity sensor 311 which is mounted on the camera; a check is made for panning or tilting by detecting whether the camera movement vector $\vec{v}$cam and the camera movement last longer than a given period of time in one direction by means of the sensor signal processing circuit 312, the A/D converter 313 and the camera movement vector computing circuit 314; and the result of this is produced in the form of the pan-tilt mode signal PTMODE.

A video signal which is obtained according to the object's image obtained by the image sensor 302 and the camera signal processing circuit 303 is converted into a digital signal by the A/D converter 304. Then, from the digital signal, the distributed state of movement vectors $\vec{v}i$ (i=1, 2, ---, n) of an n number of blocks set on the image sensing plane is detected from the digital signal by the block movement vector detection circuit 305.

The camera movement vector $\vec{v}$cam is compared with the movement vector $\vec{v}i$ of each block of the image sensing plane. Their correlation is estimated through the algorithm described in the foregoing to obtain the movement vector $\vec{v}$ which represents the image plane. At the same time, a check is made for the necessity of considering a panning or tilting camera movement. As a result, the pan-tilt control signal PTCONT is produced to show whether or not the panning or tilting movement of the camera must be taken into consideration.

Following that, the correction signal generating circuit 307 computes a lens correcting degree $\vec{v}$driv for shake correction according to the representative movement vector $\vec{v}$, the pan-tilt control signal PTCONT and the pan-tilt mode signal PTMODE. A lens correction signal thus obtained is supplied via the D/A converter 308 to the driving circuit 309 to drive thereby the correction system 310 to correct the lens system to the shaking degree.

The arrangement of the second embodiment thus gives a shake correction system which is capable of correcting the shaking of images taking into consideration both the movement of the camera and that of the object.

As described in the foregoing, the image sensing apparatus according to this invention includes means for extracting information on the movement of the external sensor and the video camera and means for comparing the image movement vector with information on the movement of the video camera in addition to the arrangement to extract the image movement vector through the image processing action on the image signal obtained from the image sensing means. The degree of shake correction is obtained on the basis of the result of a computing operation performed by the comparison means. The embodiment thus excels the conventional device which depends solely on an external sensor not only in precision, sensitivity and responsivity but also in capability for making a discrimination between an image movement caused by a moving object and an image movement resulting from the movement of the video camera. Therefore, any image movement that require no correction is distinguishable from an image movement which must be corrected. The error possibility of a shake correction system, therefore, can be greatly lessened in accordance with this invention. It is another salient advantage of the invention that any faulty action due to the object's movement can be prevented by bringing the operation of the shake correction system to a stop when the camera is judged to be not moving on the basis of the magnitude of the camera movement vector.

What is claimed is:

1. An image sensing apparatus arranged to detect information on an image movement through an image signal from image sensing means and to reduce said image movement on the basis of said movement information, comprising:
   a) movement detecting means for obtaining vector information on image movements taking place at a plurality of points on an image plane;
   b) weight setting means arranged to attach weight to said vector information obtained from each of said points and to vary said weight according to photographing conditions; and
   c) computing means for computing and obtaining the degree of image movement on the basis of movement vector information weighted by said weight setting means.

2. An apparatus according to claim 1, further comprising correction means for offsetting said image movement according to the output of said computing means.

3. An apparatus according to claim 2, further comprising a photo-taking optical system which is arranged to form an object's image on said image sensing means, and wherein said correction means includes optical axis varying means for varying the optical axis of said photo-taking optical system.

4. An apparatus according to claim 3, wherein said optical axis varying means is a variable angle prism.

5. An apparatus according to claim 1, wherein said movement detecting means is arranged to divide said image plane into a plurality of blocks, to compute the vector of movement taking place within each of said blocks and to detect parts showing movement on said image plane, the magnitude and direction of said movement.

6. An apparatus according to claim 2, wherein said weight setting means is arranged to change the weight to be attached to said movement vector information according to each of a plurality of photographing modes.

7. An apparatus according to claim 6, further comprising automatic focusing means arranged to detect the focused state of the object's image formed on said image sensing means and to automatically maintain a photo taking-optical system in an in-focus state.

8. An apparatus according to claim 7, wherein said weight setting means is arranged to change the degree of weight to be attached to said blocks of said image plane according to the output of said automatic focusing means and the photographing mode of said apparatus.

9. An apparatus according to claim 8, wherein said automatic focusing means includes manual focusing means, a fixed area focusing means arranged to automatically adjust a focus of said optical system to an object's image obtained within a focus detecting area fixedly set on said image plane, and object tracing means for adjusting the focus to an object's image by shifting a focus detecting area set on said image plane in such a way as to trace the movement of said object's image taking place within said image plane.

10. An apparatus according to claim 9, wherein said fixed area focusing means is arranged to fixedly set said focus detecting area in a central part of said image plane.

11. An apparatus according to claim 9, wherein said object tracing means includes setting means for setting an object tracing area within said image plane in a shiftable manner and control means for controlling the setting position of said object tracing area in a direction in which a difference in luminance between the inside and outside of said object tracing area increases, and wherein said focus detecting area is set in the position of said object tracing area.

12. An apparatus according to claim 9, wherein said weight setting means is arranged to attach weight to the movement vector of a peripheral part of said image plane to a greater degree than to that of a central part of said image plane when the manual focusing means of said automatic focusing means is selected.

13. An apparatus according to claim 9, wherein said weight setting means is arranged to set the movement vector weighting degree at zero for the inside of said focus detecting area and at an increased value for the outside of said area when said fixed area focusing means is selected.

14. An apparatus according to claim 9, wherein said weight setting means is arranged to set the movement vector weighting degree at zero for the inside of said focus detecting area in each of the shifted positions thereof and at an increased value for the outside of said area when said object tracing means is selected.

15. An apparatus according to claim 9, wherein said weight setting means is arranged to set the movement vector weighting degree at an increased value for the inside of said focus detecting area and at zero for the outside of said area when the apparatus is moved to trace a moving object with said focus detecting area fixed.

16. An automatic image stabilization device arranged to detect the shaking of images through an image signal produced from image sensing means and to correct said shaking of images, comprising:
 a) movement detecting means for obtaining information on image movements taking place at a plurality of points of an image sensing plane;
 b) mode discriminating means for discriminating photographing modes from each other; and
 c) weight setting means arranged to attach weight to information on movement taking place in each of blocks set on said image sensing plane and to vary the degree of weight according to the output of said mode discriminating means;
 d) computing means for computing the degree of image movement on the basis of movement information which is weighted by said weight setting means; and
 e) correction means including a correction optical system which is arranged to offset said image movement according to the output of said computing means.

17. A device according to claim 16, further comprising a photo-taking optical system arranged to form an object's image on said image sensing means, and wherein said correction optical means includes optical axis varying means for varying the direction of the optical axis of said photo-taking optical system.

18. A device according to claim 17, wherein said optical axis varying means is a variable angle prism.

19. A device according to claim 16, wherein said movement detecting means is arranged to compute the image movement vector of each of a plurality of blocks obtained by dividing said image sensing plane and to find parts of said image sensing plane having image movement and the magnitude and direction of said image movement.

20. A device according to claim 16, further comprising automatic focusing means arranged to detect the focused state of an object's image formed on said image sensing means and to automatically maintain said image in an in-focus state.

21. A device according to claim 20, wherein said weight setting means is arranged to change the degree of weight to be attached to information on the movement taking place on said image sensing plane in accordance with the photographing mode of said automatic focusing means and said image sensing means.

22. A device according to claim 21, wherein said movement detecting means is arranged to have the movement information weighted to a less degree for the continuously moving image plane parts and to a greater degree for image plane parts which are not continuously moving.

23. A device according to claim 22, wherein said automatic focusing means includes manual focusing means, a fixed area focusing means arranged to automatically adjust a focus of said optical system to an object's image obtained within a focus detecting area fixedly set on said image sensing plane, and object tracing means for adjusting the focus to an object's image by shifting a focus detecting area set on said image sensing plane in such a way as to trace the movement of said object's image taking place within said image sensing plane.

24. A device according to claim 22, wherein said object tracing means includes setting means for setting an object tracing area within said image sensing plane in a shiftable manner and control means for controlling the setting position of said object tracing area in a direction in which a difference in luminance between the inside and outside of said object tracing area increases, and wherein said focus detecting area is set in the position of said object tracing area.

25. A device according to claim 22, wherein said weight setting means is arranged to attach weight to the movement vector of a peripheral part of said image sensing plane to a greater degree than to that of a central part of said image sensing plane when the manual focusing means of said automatic focusing means is selected.

26. A device according to claim 22, wherein said weight setting means is arranged to set the movement vector weighting degree at zero for the inside of said focus detecting area and at an increased value for the outside of said area when said fixed area focusing means is selected.

27. A device according to claim 22, wherein said weight setting means is arranged to set the movement vector weighting degree at zero for the inside of said focus detecting area in each of the shifted positions thereof and at an increased value for the outside of said area when said object tracing means is selected.

28. A device according to claim 22, wherein said weight setting means is arranged to set the movement vector weighting degree at an increased value for the inside of said focus detecting area and at zero for the outside of said area when the device is moved to trace a moving object with said focus detecting area fixed.

29. An image sensing apparatus comprising:

a) first movement detecting means for detecting the degree of shaking of said apparatus;

movement detecting means for detecting b) second movement detecting means for detecting the degree of shaking of said apparatus on the basis of information which differs from information used by said first movement detecting means;

c) third movement detecting means for producing a shaking degree by computing the outputs of said first and second movement detecting means; and d) correction means for correcting said shaking degree on the basis of said shaking degree produced by said third movement detecting means.

30. An apparatus according to claim 29, further comprising an image sensor arranged to produce a sensed image signal by photo-electric converting an incident image of an object to be photographed.

31. An apparatus according to claim 30, wherein said first movement detecting means is arranged to obtain from said sensed image signal the vector of image movement taking place in each of a plurality of blocks set on the image sensing plane of said image sensor and to obtain the degree of shaking of said image by computing movement vectors thus obtained.

32. An apparatus according to claim 31, wherein said second movement detecting means is an external angular velocity sensor arranged to physically detect the angular velocity of movement of the apparatus.

33. An apparatus according to claim 32, wherein said second movement detecting means is arranged to detect a panning or tilting movement of the apparatus from the vector of movement of the apparatus detected by said angular velocity sensor.

34. An apparatus according to claim 33, wherein said second movement detecting means is arranged to compare in a cycle of fields the movement vectors detected by said angular velocity sensor and to produce a first control signal by deciding that the apparatus is making a panning or tilting movement if the movement vector is found to exceed a predetermined magnitude and remains unchanged over a period of several fields.

35. An apparatus according to claim 34, wherein said correction means is arranged to make no shake correction if said shaking degree is determined by said second movement detecting means to be resulting from panning or tilting.

36. An apparatus according to claim 35, wherein said computing means is arranged to detect the number of movement vectors which are in the same direction as the movement vector of the apparatus detected by said second movement detecting means among the vectors of image movement taking place in said blocks detected by said first movement detecting means, to compute a correlation between the image movement and the apparatus movement on the basis of the number thus detected, and further to compute and obtain from said number of movement vectors a representative value to be used for shake correction.

37. An apparatus according to claim 36, wherein said computing means is arranged to detect the number of movement vectors which are in the same direction as the movement vectors of the apparatus detected by said second movement detecting means among the vectors of image movement taking place in said blocks detected by said first movement detecting means, and to produce a second control signal indicating whether or not panning or tilting must be taken into consideration for the image movement.

38. An apparatus according to claim 36, wherein said computing means is arranged to supply the average vector of said number of vectors to said correction means as a representative value of movement vectors when the number detected indicates the necessity of taking panning or tilting into consideration.

39. An apparatus according to claim 36, wherein said computing means is arranged to supply, as a representative value of movement vectors to said correction means, the average of movement vectors of blocks which show the same direction as the movement vector of a central part of said image sensing plane among the movement vectors of a plurality of blocks detected by said first detecting means when said number indicates nonnecessity of taking the panning or tilting movement into consideration.

40. An apparatus according to claim 37, wherein said correction means is arranged to be controlled as to execution or inexecution of shake correction.

41. A camera comprising:

a) image sensing means for producing a sensed image signal by photo-electric converting an image formed by a photo-taking optical system;

b) first detecting means for detecting from said sensed image signal the movement of said image within the image sensing plane of said image sensing means;

c) second detecting means for detecting the movement of the camera;

d) a correction optical system arranged to offset said camera movement; and e) control means for controlling the correcting action and correcting degree of said correction optical system on the basis of the outputs of said first and second detecting means.

42. A camera according to claim 41, wherein said first detecting means is arranged to obtain from said sensed image signal the vector of image movement in each of a plurality of blocks set on the image sensing plane of said image sensing means and to obtain the shaking degree of the image by computing said movement vectors.

43. A camera according to claim 42, wherein said second movement detecting means is an external angular velocity sensor which is arranged to physically detect the movement of the camera, and wherein a panning or tilting movement of the camera is detected from the vector of camera movement detected by said angular velocity sensor.

44. A camera according to claim 43, wherein said second detecting means is arranged to compare in a cycle of fields the values of the movement vectors detected by said angular velocity sensor, and to produce a panning signal by deciding said movement to be a panning or tilting movement if said movement vector exceeds a predetermined value and lasts over a period of predetermined number of fields.

45. A camera according to claim 44, wherein said control means is arranged to have no shake correction performed by said correction optical system when the camera is determined to be in panning or tiling movement.

46. A camera according to claim 45, wherein said control means is arranged to detect the number of movement vectors showing the same direction as the camera movement vector detected by said second movement detecting means among the image movement vectors of blocks detected by said first movement detecting means, to produce, on the basis of the number detected, a determination signal indicating whether or not panning or tilting is to be taken into consideration, and to compute a representative value of movement vectors for determining the direction and degree of shake correction.

47. A camera according to claim 46, wherein said control means is arranged to supply the average of said number of vectors to said correction optical system as said representative value of movement vectors when said number indicates the necessity of consideration of a panning or tilting movement of the camera.

48. A camera according to claim 46, wherein said control means is arranged to supply, as said representative value to said correction optical system, the average of movement vectors which show the same direction as the image movement vector of a central part of said image sensing plane among the movement vectors detected from the plurality of blocks by said first detecting means when said number indicates the necessity of consideration of a panning or tilting movement of the camera.

49. A camera according to claim 48, wherein said control means is arranged to perform control as to execution or inexecution of shake correction on the basis of a logical product of said determination signal and said panning signal.

50. An automatic image stabilization camera comprising:
a) image sensing means arranged to produce a sensed image signal by photo-electric converting an image formed by a photo-taking optical system;
b) detection means for detecting from said sensed image signal the movement of said image on the image sensing plane of said image sensing means;
c) an angular velocity sensor arranged to detect a panning or tilting movement of the camera;
d) a correction optical system arranged to correct the shaking of the camera by varying the optical axis of said photo-taking optical system;
e) computing means arranged to determine necessity or nonnecessity of the shake correction by said correction optical system and to determine the degree of said shake correction by computing the output of said detection means and that of said angular velocity sensor; and
f) control means for controlling said correction optical system on the basis of the output of said computing means.

* * * * *

UNITED STATES PATENT AND TRADEMARK OFFICE
CERTIFICATE OF CORRECTION

PATENT NO. : 5,107,293

DATED : April 21, 1992

INVENTOR(S) : Masayoshi Sekine, et al.

It is certified that error appears in the above-identified patent and that said Letters Patent is hereby corrected as shown below:

Col. 1, line 17.  Change "contrived" to -- developed --

Col. 1, line 26.  Change "necessitates" to -- necessitate --

Col. 2, line 50.  Change "are" to -- is --

Col. 2, line 62.  Change "irrespectively" to -- irrespective --

Col. 3, line 24.  Change "etc.." to -- and the like. --

Col. 5, line 24.  After "shown" insert a -- , --

Col. 5, line 32.  Change "show" to -- shows --

Col. 6, line 2.  Change "irrespectively" to -- irrespective --

Col. 8, line 15.  After "change" insert -- which --

Col. 9, lines 4, 10.  Change "less" to -- lesser --

Col. 13, line 12.  Change "etc.." to -- and the like. --

Col. 14, line 24.  Change "vdriv" to -- $\vec{v}$driv --

Col. 15, line 13.  Change "$\rightarrow\vec{v}$cor1" to -- $\vec{v}$cor1 --

Col. 15, line 14.  Change "are" to -- is --

Col. 15, line 37, change "$\rightarrow$Vcor1" to -- $\vec{v}$cor1 --

Col. 15, line 51, change "$\rightarrow$Vcor2" to -- $\vec{v}$cor2 --

Col. 15, line 59.  Change "$\rightarrow\vec{v}$cor1" to -- $\vec{v}$cor1 --

Col. 15, line 62.  Change "pan tilt" to -- pan-tilt --

Col. 15, line 68.  Change "$\rightarrow$vcor2" to -- $\vec{v}$cor2 --

Col. 16, line 12.  Delete "and"

UNITED STATES PATENT AND TRADEMARK OFFICE
CERTIFICATE OF CORRECTION

PATENT NO. : 5,107,293
DATED : April 21, 1992
INVENTOR(S) : Masayoshi Sekine, et al.

It is certified that error appears in the above-identified patent and that said Letters Patent is hereby corrected as shown below:

Col. 16, line 18. Change "$\vec{v}\mathrm{cam}$" to -- $\vec{V}\mathrm{cam}$ --

Col. 16, line 39. Change "little moves" to -- moves little --

Col. 16, lines 60, 67, change "$\rightarrow$Vcor2" to -- $\vec{V}\mathrm{cor2}$ --

Col. 17, line 6, change "$\rightarrow$Vcor2" to -- $\vec{V}\mathrm{cor2}$ --

Col. 17, line 36. Change "irrespectively" to -- irrespective --

Col. 17, line 38. Change "penning" to -- panning --

Col. 19, line 56. After "excels" insert -- over --

Col. 19, line 63. Change "require" to -- requires --

Col. 20, line 13. After "image" insert -- sensing --

Col. 22, line 19. Change "less" to -- lesser --

Col. 23, line 3. Delete "movement detecting means for detecting"

Col. 26, line 16. Change "arrangedto" to -- arranged to --

Signed and Sealed this

First Day of March, 1994

Attest:

BRUCE LEHMAN

*Attesting Officer*         *Commissioner of Patents and Trademarks*